(12) United States Patent
Zhang et al.

(10) Patent No.: US 12,468,352 B2
(45) Date of Patent: Nov. 11, 2025

(54) HINGE FOR SYNCHRONOUS ROTATION AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventors: Jun Zhang, Beijing (CN); Chuankun You, Beijing (CN); Fengping Wu, Beijing (CN); Wei Qing, Beijing (CN); Zhihui Wang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/921,671

(22) PCT Filed: Nov. 30, 2021

(86) PCT No.: PCT/CN2021/134503
§ 371 (c)(1),
(2) Date: Oct. 27, 2022

(87) PCT Pub. No.: WO2023/097476
PCT Pub. Date: Jun. 8, 2023

(65) Prior Publication Data
US 2024/0241552 A1  Jul. 18, 2024

(51) Int. Cl.
*G06F 1/16* (2006.01)
*F16C 11/12* (2006.01)

(52) U.S. Cl.
CPC ............ *G06F 1/1681* (2013.01); *F16C 11/12* (2013.01); *G06F 1/1616* (2013.01)

(58) Field of Classification Search
CPC .... G06F 1/1616; G06F 1/1681; H05K 5/0226
See application file for complete search history.

(56) References Cited

U.S. PATENT DOCUMENTS 9,464,471 B1 * 10/2016 Chen .................... G06F 1/1681
9,933,764 B2    4/2018 Na et al.
(Continued)

FOREIGN PATENT DOCUMENTS

CN    202273985 U    6/2012
CN    104656810 A    5/2015
(Continued)

*Primary Examiner* — Allen L Parker
*Assistant Examiner* — Douglas R Burtner
(74) *Attorney, Agent, or Firm* — XSENSUS LLP

(57) ABSTRACT

Provided is a hinge. The hinge includes: a mounting base, two torsion shafts, a resilient structure, and two rotary arms; wherein the two torsion shafts and the resilient structure are mounted on the mounting base, the resilient structure is disposed between the two torsion shafts, and the two rotary arms are connected to the two torsion shafts respectively; a bump is disposed on a side wall of each of the two torsion shafts, wherein the bump is disposed on a side, close to the resilient structure, of the torsion shaft, and the bumps of the two torsion shafts are in contact with the resilient structure; and the resilient structure is configured to apply a force to the torsion shaft by the bumps, such that the two rotary arms have a tendency to rotate away from each other.

20 Claims, 20 Drawing Sheets

(56) References Cited

U.S. PATENT DOCUMENTS

| | | | |
|---|---|---|---|
| 10,401,914 B2* | 9/2019 | Shang | E05D 5/04 |
| 10,761,574 B1* | 9/2020 | Hsu | G06F 1/1616 |
| 11,340,661 B2* | 5/2022 | Yen | G06F 1/1616 |
| 11,720,153 B2* | 8/2023 | Hsu | G06F 1/1681 |
| | | | 16/250 |
| 2015/0159413 A1* | 6/2015 | Chen | G06F 1/1681 |
| | | | 16/342 |
| 2015/0342068 A1* | 11/2015 | Su | H04M 1/022 |
| | | | 16/354 |
| 2016/0032633 A1* | 2/2016 | Hsu | E05D 3/122 |
| | | | 16/368 |
| 2016/0274597 A1 | 9/2016 | Na et al. | |
| 2017/0192467 A1* | 7/2017 | Holung | G06F 1/1681 |
| 2017/0235337 A1* | 8/2017 | Vic | E05D 3/12 |
| | | | 361/679.55 |
| 2018/0042129 A1* | 2/2018 | Park | H05K 5/0234 |
| 2018/0067520 A1* | 3/2018 | Määttä | G06F 1/1681 |
| 2018/0136696 A1* | 5/2018 | Chen | H04M 1/0216 |
| 2018/0363341 A1* | 12/2018 | Siddiqui | G06F 1/1618 |
| 2019/0056768 A1* | 2/2019 | Lin | G06F 1/1681 |
| 2019/0324499 A1* | 10/2019 | Miyamoto | G06F 1/1616 |
| 2020/0348732 A1* | 11/2020 | Kang | G06F 1/1652 |
| 2021/0048853 A1* | 2/2021 | Chen | G06F 1/1681 |
| 2021/0072800 A1 | 3/2021 | Lin et al. | |
| 2021/0173449 A1 | 6/2021 | Yao et al. | |
| 2021/0263565 A1 | 8/2021 | Yen et al. | |
| 2021/0271294 A1* | 9/2021 | Liao | G06F 1/181 |
| 2021/0397226 A1* | 12/2021 | Siddiqui | G06F 1/1616 |
| 2022/0303371 A1* | 9/2022 | Liao | H04M 1/0216 |
| 2022/0365569 A1* | 11/2022 | Hsu | F16C 11/04 |
| 2022/0397943 A1* | 12/2022 | Hsiang | G06F 1/1681 |
| 2023/0044949 A1* | 2/2023 | Park | G06F 1/1681 |
| 2023/0143511 A1* | 5/2023 | Xi | H04M 1/022 |
| | | | 361/679.27 |
| 2023/0160243 A1* | 5/2023 | Yang | E05D 3/18 |
| | | | 16/354 |
| 2023/0229189 A1* | 7/2023 | Li | F16H 1/22 |
| 2023/0403347 A1* | 12/2023 | Liu | H04M 1/022 |
| 2024/0053803 A1* | 2/2024 | Park | G06F 1/1681 |
| 2024/0183383 A1* | 6/2024 | Ying-Hsing | F16C 11/04 |
| 2024/0275872 A1* | 8/2024 | Zheng | G06F 1/1681 |
| 2024/0288902 A1* | 8/2024 | You | F16C 11/04 |
| 2024/0295239 A1* | 9/2024 | Zeng | H05K 5/0226 |
| 2024/0341047 A1* | 10/2024 | Zeng | G06F 1/1652 |
| 2024/0370064 A1* | 11/2024 | Xu | G06F 1/1652 |
| 2024/0426336 A1* | 12/2024 | Wang | F16C 11/10 |
| 2025/0126729 A1* | 4/2025 | Kim | H05K 5/0226 |

FOREIGN PATENT DOCUMENTS

| | | |
|---|---|---|
| CN | 205895880 U | 1/2017 |
| CN | 106555815 A | 4/2017 |
| CN | 106704355 A | 5/2017 |
| CN | 210715544 U | 6/2020 |
| CN | 112096728 A | 12/2020 |
| CN | 112178041 A | 1/2021 |
| CN | 112648279 A | 4/2021 |
| CN | 214274224 U | 9/2021 |
| TW | 568023 U | 12/2003 |
| WO | 2019223012 A | 11/2019 |

* cited by examiner

HINGE FOR SYNCHRONOUS ROTATION AND ELECTRONIC DEVICE

CROSS-REFERENCE TO RELATED APPLICATION

This application is a U.S. national phase application based on PCT/CN2021/134503, filed on Nov. 30, 2021, the disclosure of which is incorporated herein by reference in its entirety.

TECHNICAL FIELD

The present disclosure relates to the field of display technologies, and in particular, relates to a hinge and an electronic device.

BACKGROUND

The hinge is a connecting member that provides a relative rotation function and is mainly used for the connection between a rotating part and a substrate. Currently, the hinge is widely used in various electronic devices, for example, laptop computers. The display part and the system part of a laptop computer are connected by a hinge to open and close the laptop computer.

SUMMARY OF THE UTILITY MODEL

Embodiments of the present disclosure provide a hinge and an electronic device. The technical solutions are as follows.

According to some embodiments of the present disclosure, a hinge is provided. The hinge includes: a mounting base, two torsion shafts, a resilient structure and two rotary arms; wherein the two torsion shafts and the resilient structure are mounted on the mounting base, the resilient structure is disposed between the two torsion shafts, and the two rotary arms are connected to the two torsion shafts respectively; a bump is disposed on a side wall of each of the two torsion shafts, wherein the bump is disposed on a side, close to the resilient structure, of the torsion shafts, and the bumps of the two torsion shafts are in contact with the resilient structure; and the resilient structure is configured to apply a force to the torsion shaft by the bumps, such that the two rotary arms have a tendency to rotate away from each other.

In some embodiments of the present disclosure, the resilient structure includes a guide member, a slider and a first resilient member; wherein the guide member is fixedly connected to the mounting base; the slider is connected to the guide member and is slidable along the guide member, and the bump is in contact with the slider; and the first resilient member is configured to supply a spring force to the slider, wherein the spring force is in a direction towards the bump.

In some embodiments of the present disclosure, two push slots are disposed on a surface of the slider, wherein the two push slots are disposed on the surfaces, close to the bump, of the slider and at opposite sides of the slider, the two push slots are arranged along the two torsion shafts, and the bumps of the two torsion shafts are disposed in the two push slots respectively.

In some embodiments of the present disclosure, bottom surfaces of the two push slots are inclined surface, and the bump is in contact with the inclined surface.

In some embodiments of the present disclosure, a guide hole is disposed in a middle of the slider, and the guide hole is disposed between the two push slots; and the guide member includes a guide rod, wherein at least at one end of the guide rod is connected to the mounting base and is disposed in the guide hole.

In some embodiments of the present disclosure, the slider includes a body portion and two protrusions, wherein the two push slots are disposed on opposite sides of the body portion; the two protrusions are disposed on opposite sides of the body portion and between the two push slots and connected to the body portion; each of the two protrusions is provided with a guide hole; and the guide member includes two guide rods, wherein at least one end of the two guide rods is fixedly connected to the mounting base, and the two guide rods are disposed in the guide holes of the two protrusions respectively.

In some embodiments of the present disclosure, a first retaining protrusion is disposed on a side wall of the guide rod, wherein the first retaining protrusion is disposed on a side, close to the bump, of the slider.

In some embodiments of the present disclosure, the first resilient member is disposed between the mounting base and the slider and on a side, away from the first retaining protrusion, of the slider, and the first resilient member is in a compressed state; or the first resilient member is disposed on a side, close to the first retaining protrusion, of the slider, and the first resilient member is in a stretched state.

In some embodiments of the present disclosure, the guide member includes a base, the base being provided with a holding slot, the holding slot being disposed on a side, close to the bump, of the base; the slider is disposed partly in the holding slot and partly outside the holding slot and is telescopable relative to the base; and the first resilient member is disposed in the holding slot.

In some embodiments of the present disclosure, a second retaining protrusion is disposed on a side wall of the holding slot, a third retaining protrusion is disposed on a side wall of the slider, and the third retaining protrusion is disposed in the holding slot and on a side, distal from the bump, of the second retaining protrusion; and on a plane perpendicular to a telescoping direction of the slider, an orthographic projection of the second retaining protrusion is at least partially overlapped with an orthographic projection of the third retaining protrusion.

In some embodiments of the present disclosure, the first resilient member is a spring.

In some embodiments of the present disclosure, the hinge further includes two sliding plates and a fixed block, the fixed block being disposed in the mounting base and at an end of the torsion shaft, the fixed block having two curved slides; wherein the sliding plate includes a sliding body and an arc arm, the sliding body is connected to one end of the arc arm, the arc arms of the two sliding plates are disposed in the two arc slides respectively, and the sliding bodies of the two sliding plates are connected to the two rotary arms respectively.

In some embodiments of the present disclosure, the sliding body has a strip slot; and a connecting slider is disposed on a side, close to the sliding plate, of the rotary arm, and the connecting sliders of the two rotary arms are disposed in the strip slots of the two sliding plates respectively.

In some embodiments of the present disclosure, the hinge further includes a synchronization shaft and a fixed base, the synchronization shaft and the fixed base being disposed in the mounting base, a middle of the synchronization shaft being rotatably connected to the fixed base, the fixed base being connected to the mounting base; wherein the synchronization shaft is disposed between the two torsion shafts and perpendicular to the two torsion shafts; and the synchronization shaft has a first synchronization gear at a first end of the synchronization shaft and a second synchronization gear at a second end of the synchronization shaft, the first synchronization gear is connected to one of the two torsion shafts by transmission and the second synchronization gear is connected to the other of the two torsion shafts by transmission.

In some embodiments of the present disclosure, a mounting through slot is disposed in a middle of the fixed base, the synchronization shaft is disposed in the mounting through slot, and the first synchronization gear and the second synchronization gear are disposed on opposite sides of the fixed base.

In some embodiments of the present disclosure, the torsion shaft includes a spindle and a damping structure, the damping structure including a first end cam, a second end cam, a first retaining member, a second retaining member and a second resilient member; wherein the first retaining member, the first end cam, the second end cam, the second resilient member and the second retaining member are sequentially sleeved on the spindle, and an end face of the first end cam is engaged with an end face of the second end cam; and side walls of the first end cams of two the torsion shafts are connected to each other.

In some embodiments of the present disclosure, the damping structure further includes a friction plate, the friction plate being sleeved on the spindle, the friction plate being disposed at least: between the first retaining member and the first end cam; between the second end cam and the second resilient member; or between the second resilient member and the second retaining member.

According to some embodiments of the present disclosure, an electronic device is provided. The electronic includes the hinge described in any one of the above embodiments.

In some embodiments of the present disclosure, the electronic device is a laptop computer.

BRIEF DESCRIPTION OF THE DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

To make the objectives, technical solutions, and advantages of the present disclosure clearer, the following further describes implementations of the present disclosure in detail with reference to the accompanying drawings.

In the related technology, the hinge includes a mount, two torsion shafts, and two rotary arms. The two rotary arms are connected to the two torsion shafts respectively. The two rotary arms are connected to the display part and the system part of the laptop computer. When the laptop is opened or closed, the display part and the system part rotate relative to each other, thus driving the rotary arms to rotate and making the torsion shafts rotate, and the user needs to provide a certain amount of torsion to overcome the resistance of the hinge to open and close the laptop.

In order to enable the user to open the laptop with one hand, it is necessary to make the hinge produce less resistance during the opening process. In order to keep the display and system parts of the laptop at a small angle without automatically closing, it is necessary to make the hinge have more resistance in the process of closing. The hinge in the related technology provides the same resistance during opening and closing of the laptop, resulting in the inability to achieve the two design purposes when designing the laptop, i.e., the inability to achieve the function of light opening and heavy closing.

Figure 1:
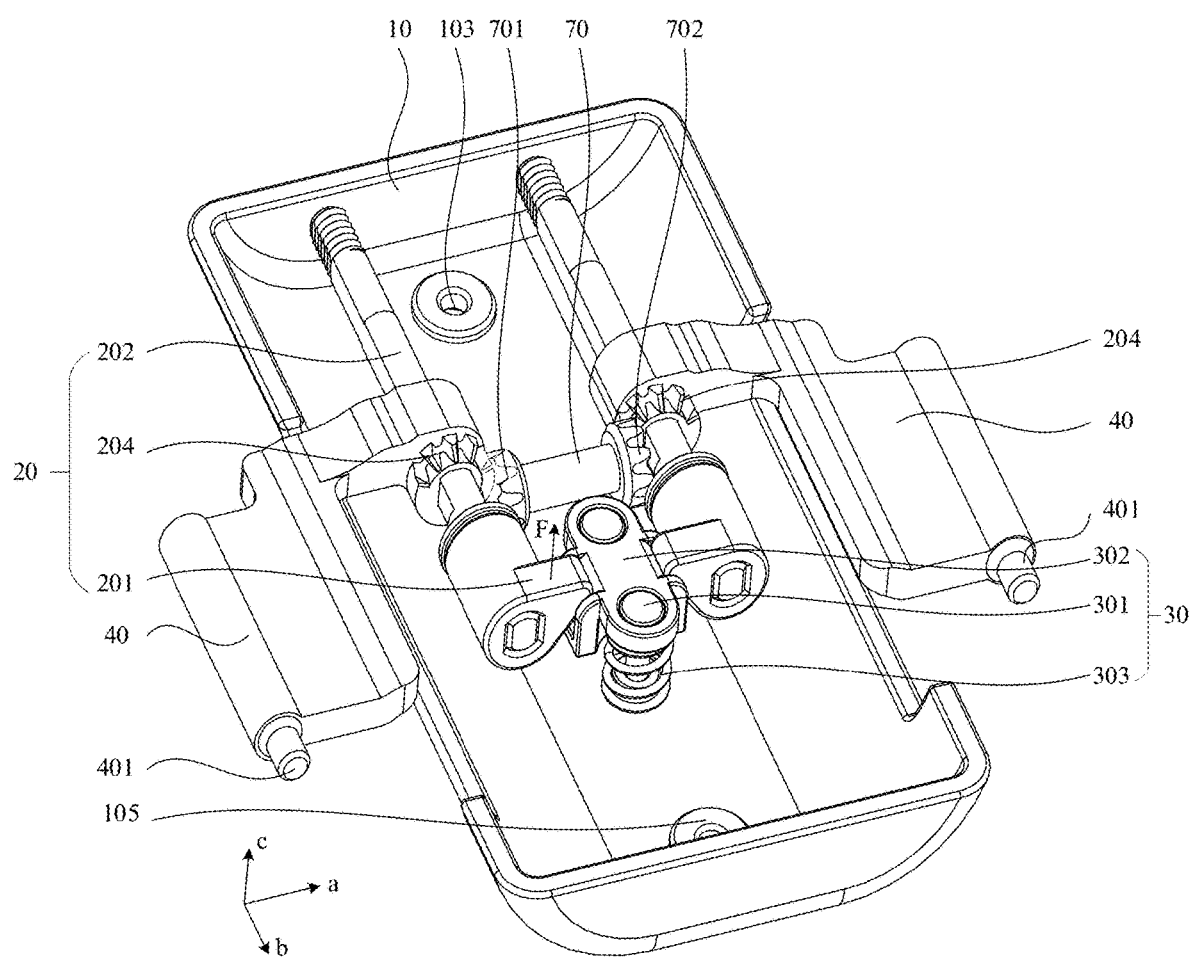
FIG. 1 is a schematic diagram of a structure of a hinge according to some embodiments of the present disclosure.

FIG. 1 is a schematic diagram of the structure of a hinge according to embodiments of the present disclosure. Referring to FIG. 1, the hinge includes a mounting base 10, two torsion shafts 20, a resilient structure 30 and two rotary arms 40. Both the two torsion shafts 20 and the resilient structure 30 are mounted on the mounting base 10, and the resilient structure 30 is disposed between the two torsion shafts 20, and the two rotary arms 40 are connected to the two torsion shafts 20 respectively. A bump is disposed on a side w all of the two torsion shafts 20, and the bump 201 is disposed on a side, close to the resilient structure 30, of the torsion shaft 20, and the bumps 201 of the two torsion shafts 20 are in contact with the resilient structure 30. The resilient structure 30 is configured to apply a force to the torsion shaft 20 by the bumps 201, such that the two rotary arms 40 have a tendency to rotate away from each other. The resilient structure 30 supplies a force to the torsion shaft 20 by the bumps 201, such that the two rotary arms 40 have a tendency to rotate away from each other. That is, the two torsion shafts 20 are subjected to a torsion of the resilient structure 30 in opposite directions and the two rotary arms 40 rotate under the action of the torsion of the resilient structure 30 with the ends, away from the torsion shaft 20, of the two rotary arms 40 moving away from each other.

In the embodiments of the present disclosure, the mounting base 10 provides mounting space for the torsion shaft 20 and the resilient structure 30. When rotating, the rotary arm 40 drives the components connected to the rotary arm 40 to rotate, for example, the rotary arm 40 drives the system end and the display end of the laptop to rotate to achieve opening and closing of the laptop.

In the case that the hinge is applied to a laptop computer, the two rotary arms 40 are connected to the system terminal and the display terminal of the laptop computer respectively. When the laptop is closed, the two rotary arms 40 rotate in opposite directions, and because the two rotary arms 40 are connected to the two torsion shafts 20 respectively, the two torsion shafts 20 also rotate with the two rotary arms 40, and the resilient structure 30 is configured to supply a force to the bump 201, such that the two rotary arms 40 have a tendency to rotate away from each other. In this way, the force supplied by resilient structure 30 to the rotary arms 40 is resistance, and when closing the laptop, the user needs to overcome the resistance of the resilient structure 30 to close the laptop, such that the laptop can be at a smaller angle and still not closed. When opening the laptop, the two rotary arms rotate in the direction away from each other, force supplied by the resilient structure to the rotary arm 40 at this time is a boost, the resilient structure 30 can provide a portion of resistance when opening the laptop, the user only needs to supply a smaller force to open the laptop. That is, the function of light opening and heavy closing of the laptop is achieved.

Figure 2:
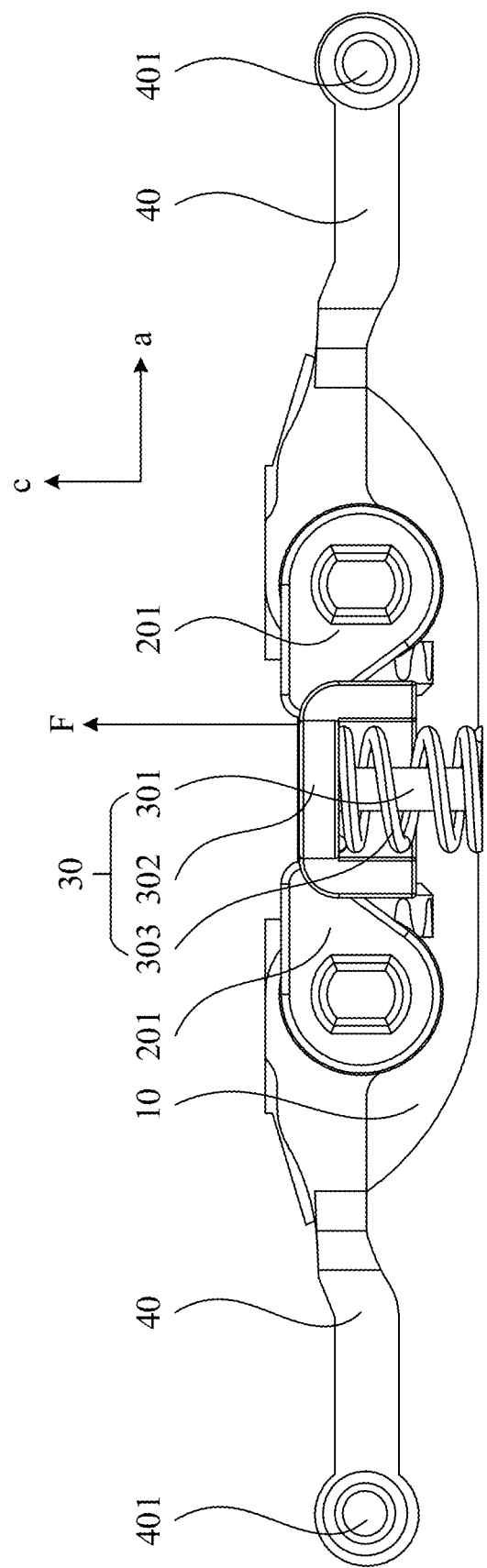
FIG. 2 is a schematic diagram of a main view structure of the hinge in FIG. 1.

FIG. 2 is a schematic diagram of the main view structure of the hinge in FIG. 1. The hinges in both FIG. 1 and FIG. 2 are in the open state, and the angle between the two rotary arms 40 is 180 degrees. Referring to FIGS. 1 and 2, the two rotary arms 40 are disposed along the first direction a, the two torsion shafts 20 extend along the second direction b, and the direction of the force F supplied by the resilient structure 31) to the bump 201 is the third direction c, wherein any two of the first direction a, the second direction b and the third direction c are perpendicular to each other.

Figure 3:
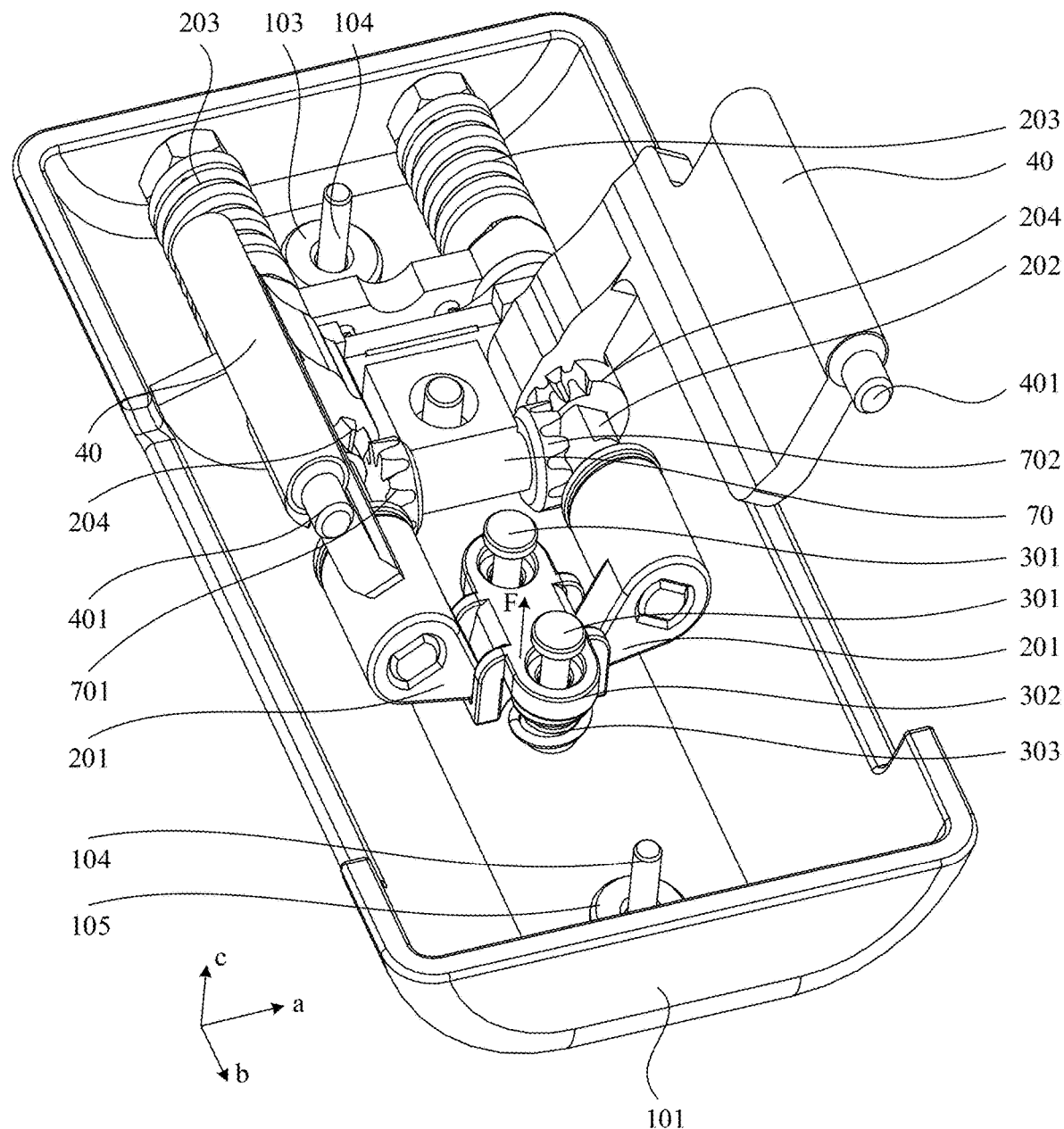
FIG. 3 is a schematic diagram of a structure of a hinge according to some embodiments of the present disclosure.
Figure 4:
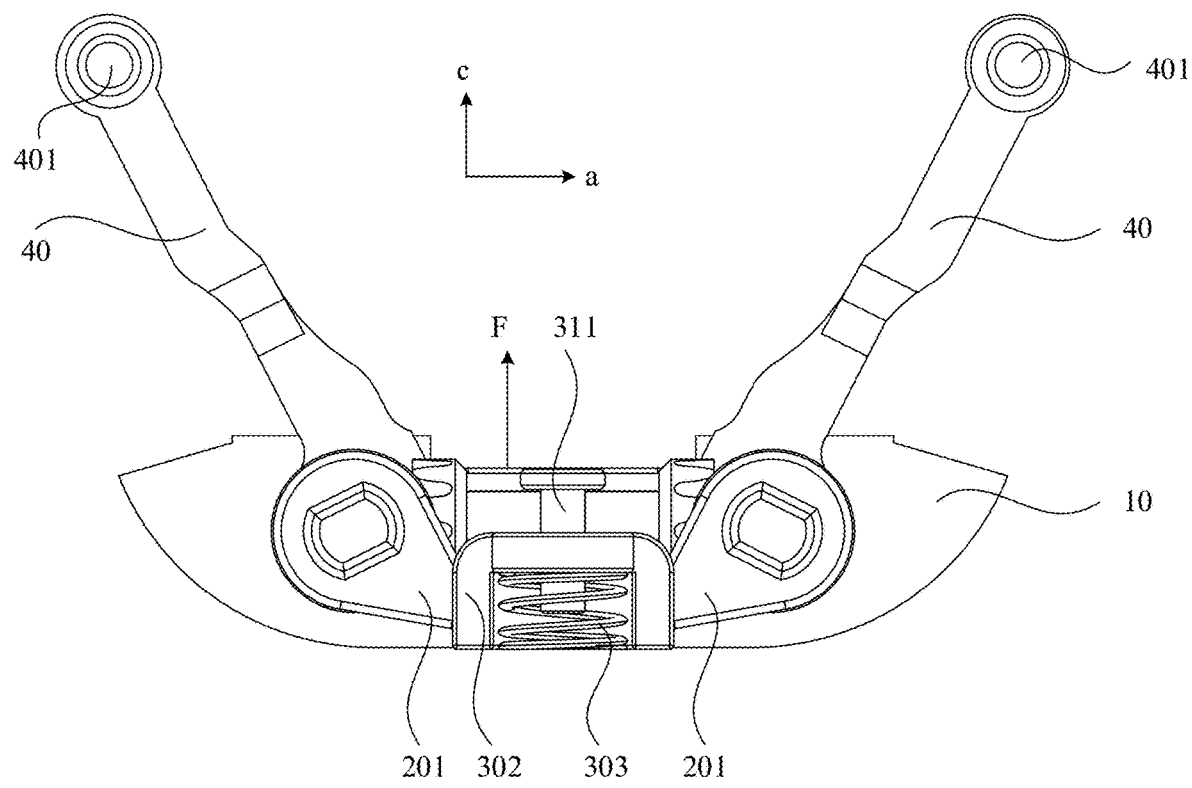
FIG. 4 is a schematic diagram of a main view structure of the hinge in FIG. 3.

FIG. 3 is a schematic diagram of the structure of a hinge according to embodiments of the present disclosure. Referring to FIG. 3, the hinge is in a half-open state. FIG. 4 is a schematic diagram of the main view structure of the hinge in FIG. 3. Referring to FIG. 3 and FIG. 4, the angle between the two rotary arms 40 is less than 180 degrees.

Figure 5:
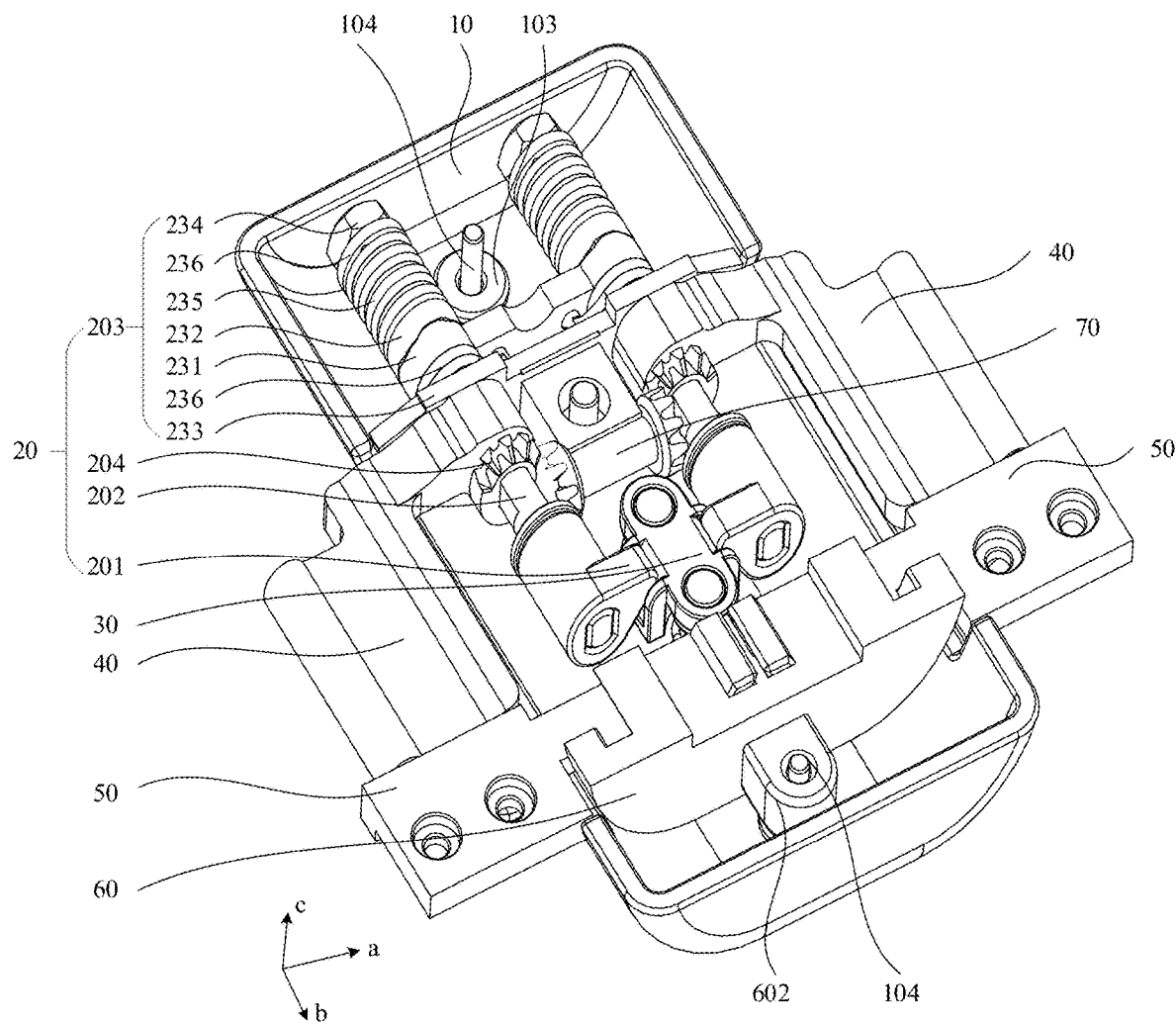
FIG. 5 is a schematic diagram of a structure of a damping structure according to some embodiments of the present disclosure.

FIG. 5 is a structural schematic diagram of a damping structure according to embodiments of the present disclosure. Referring to FIG. 5, the torsion shaft 20 includes a spindle 202 and a damping structure 203. The damping structure 203 is configured to provide resistance during opening and closing of the hinge. When opening or closing the laptop, the display part rotates relative to the system part, thereby driving the rotary arm 40 to rotate, causing the torsion shaft 20 to rotate, and the user needs to provide a certain amount of torsion to overcome the resistance of the damping structure 203 to achieve opening and closing of the laptop.

Figure 6:
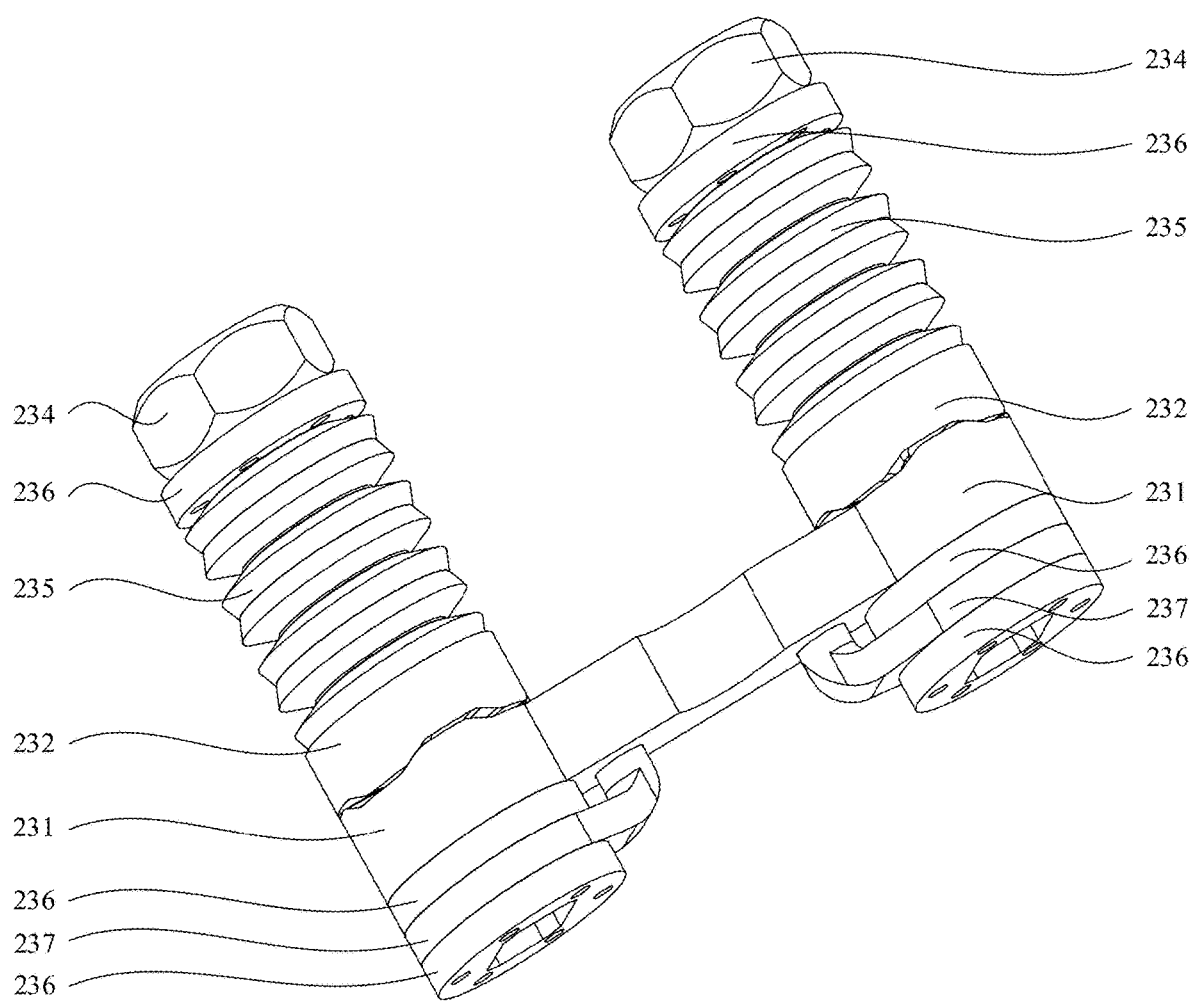
FIG. 6 is a schematic diagram of a structure of a damping structure according to some embodiments of the present disclosure.

FIG. 6 is a structural schematic diagram of a damping structure according to embodiments of the present disclosure. Referring to FIGS. 5 and 6, the damping structure 203 includes a first end cam 231, a second end cam 232, a first retaining member 233, a second retaining member 234, and a second resilient member 235.

The first retaining member 233, the first end cam 231, the second end cam 232, the second resilient member 235 and the second retaining member 234 are sequentially sleeved on the spindle 202 (not shown in FIG. 5), and an end face of the first end cam 231 is engaged with an end face of the second end cam 232, and side walls of the first end cam 231 of the two torsion shafts 20 are connected to each other.

In the embodiments of the present disclosure, the first retaining member 233, the first end cam 231, the second end cam 232, the second resilient member 235, and the second retaining member 234 are all sleeved on the spindle 202. When the spindle 202 rotates, the spindle 202 drives the second end cam 232 to rotate. Because the side walls of the first end cam 231 of the two torsion shafts 20 are connected, the first end cam 231 does not rotate. The engagement relationship between the first end cam 231 and the second end cam 232 changes. A second resilient member 235 is disposed between the first retaining member 233 and the second end cam 232, which compresses the second resilient member 235 when the second end cam 232 rotates, such that the user needs to provide a certain amount of torsion to overcome the resistance of the damping structure 203 to achieve opening and closing of the laptop.

Referring again to FIG. 6, the damping structure 203 further includes a friction plate 236, which is sleeved on the spindle 202, and the friction plate 236 is disposed between the first retaining member 233 and the first end face cam 231. In the process of opening and closing the hinge, friction force is inevitably generated between the first retaining member 233 and the first end cam 231. Arranging the friction plate 236 between the first retaining member 233 and the first end cam 231 can reduce the friction force and reduce the possibility of damage to the first retaining member 233 and the first end cam 231. The friction force is also generated between friction plate 236 and the first retaining member 233 and the friction plate 236 and the first retaining member 233, which prevents the rotation of the spindle 202 and increase the force needed to be supplied by the user when opening and closing the laptop.

Referring again to FIG. 6, the friction plate 236 is also disposed between the second end cam 232 and the second resilient member 235, which reduces the possibility of damage to the second end cam 232 and the second resilient member 235 is reduced, and increases the force needed to be supplied by the user when opening and closing the laptop.

Referring again to FIG. 6, the friction plate 236 is also disposed between the second resilient member 235 and the second retaining member 234, which reduces the possibility of damage to the second resilient member 235 and the second retaining member 234, and increases the force needed to be supplied by the user when opening and closing the laptop.

In the embodiments of the present disclosure, the first end cam 231 of the two torsion shafts 20 can be manufactured separately and then the sidewalls of the two first end cams 231 can be connected together. In other embodiments, the two first end cams 231 can be formed sin one piece.

Referring again to FIG. 6, the damping structure 203 further includes a retaining plate 237, which is disposed on the spindle 202 and is disposed between the first end cam 231 and the first retaining member 233 (not shown in FIG. 6). The retaining plate 237 is connected to the side wall of the first end cam 231, and the friction plates 236 are disposed between the retaining plate 237 and the first end cam 231, and between the retaining plate 237 and the first retaining member 233. Because the retaining plate 237 is connected to the side wall of first end face cam 231, when the spindle 202 rotates, the first end face cam 231 and the retaining plate 237 does not rotate, such that the friction force is generated between the friction plates 236 on both sides of retaining plate 237 and retaining plate 237, and the force needed to be supplied by the user when opening and closing the laptop is increased.

Figure 7:
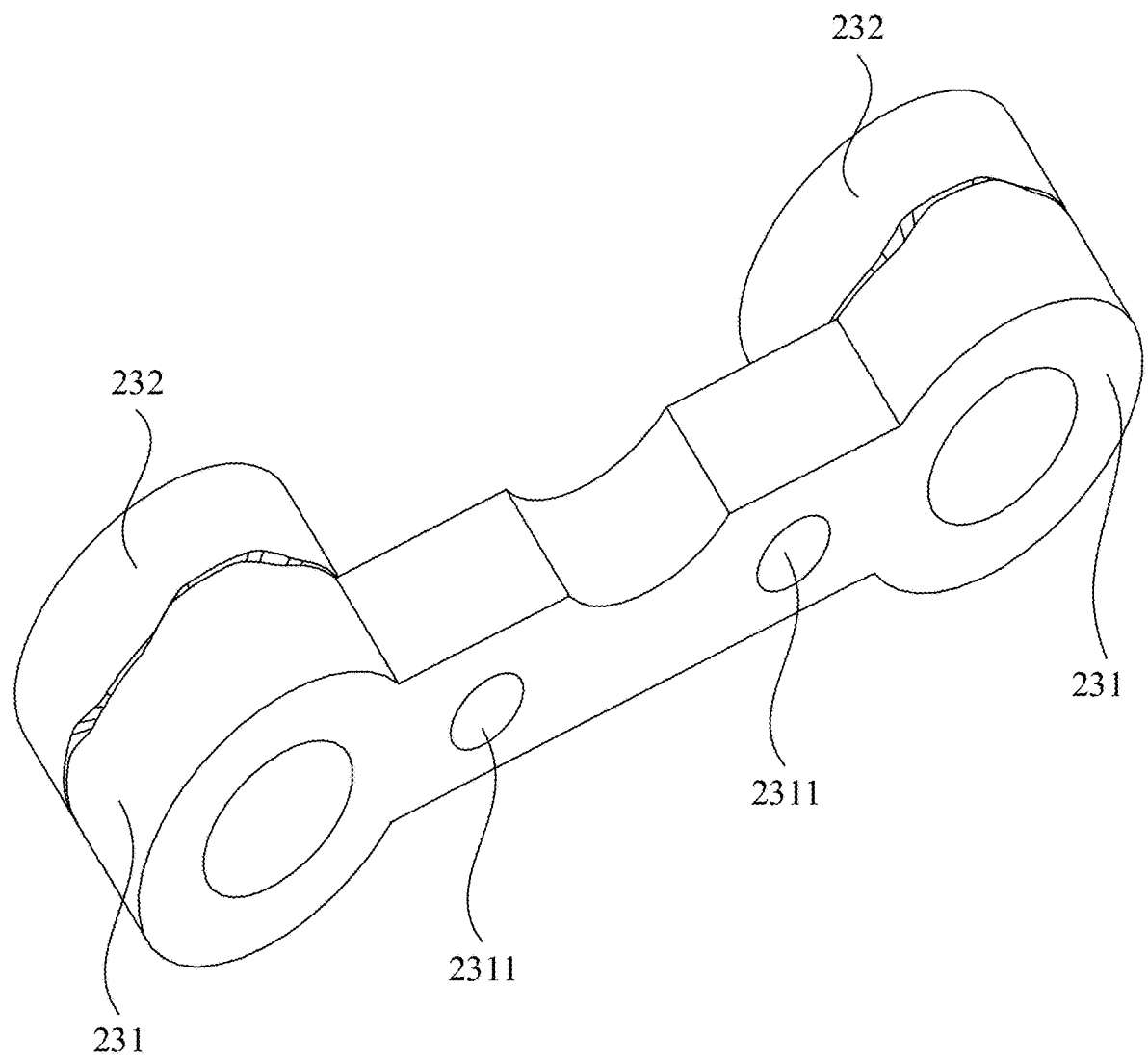
FIG. 7 is a schematic diagram of a fit between a first end cam and a second end cam according to some embodiments of the present disclosure.

FIG. 7 is a schematic diagram of the fit of a first end cam and a second end cam according to embodiments of the present disclosure. Referring to FIG. 7, a retaining hole 2311 is disposed on a side wall of the first end face cam 231, and the retaining plate 237 has a retaining protrusion corresponding to the retaining hole 2311, and the retaining protrusion on the retaining plate 237 is disposed in the retaining hole 2311, thereby connecting the retaining plate 237 to the side wall of the first end face cam 231.

Figure 8:
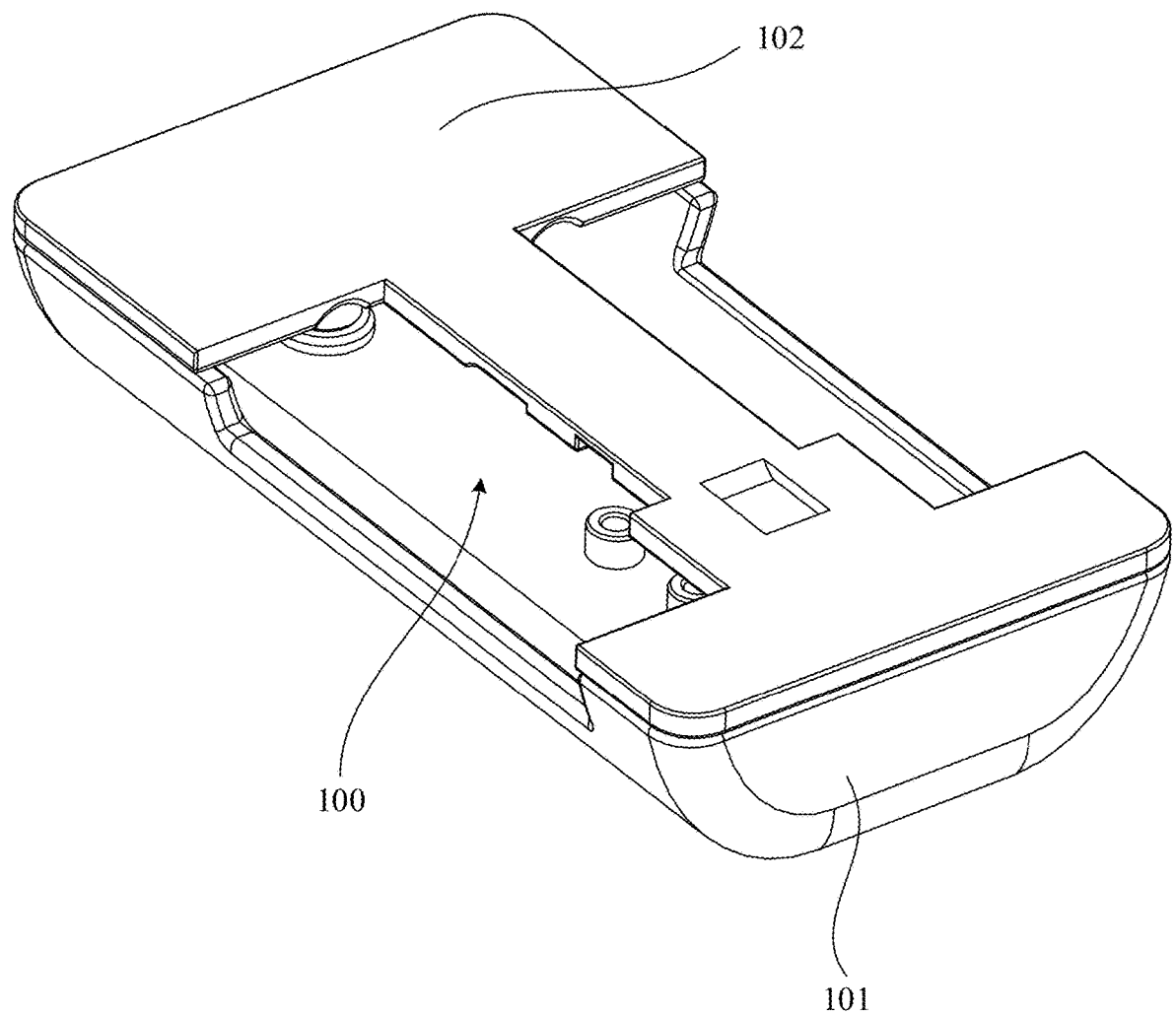
FIG. 8 a schematic diagram of a structure of a mounting base according to some embodiments of the present disclosure.

FIG. 8 is a schematic diagram of the structure of a mounting base according to embodiments of the present disclosure. Referring to FIG. 8, the mounting base 10 includes a mounting bottom base 101 and a mounting cover 102, and a mounting cavity 100 is formed between the mounting bottom base 101 and the mounting cover 102. The torsion shaft 20 and the resilient structure 30 are disposed within the mounting cavity 100.

Figure 9:
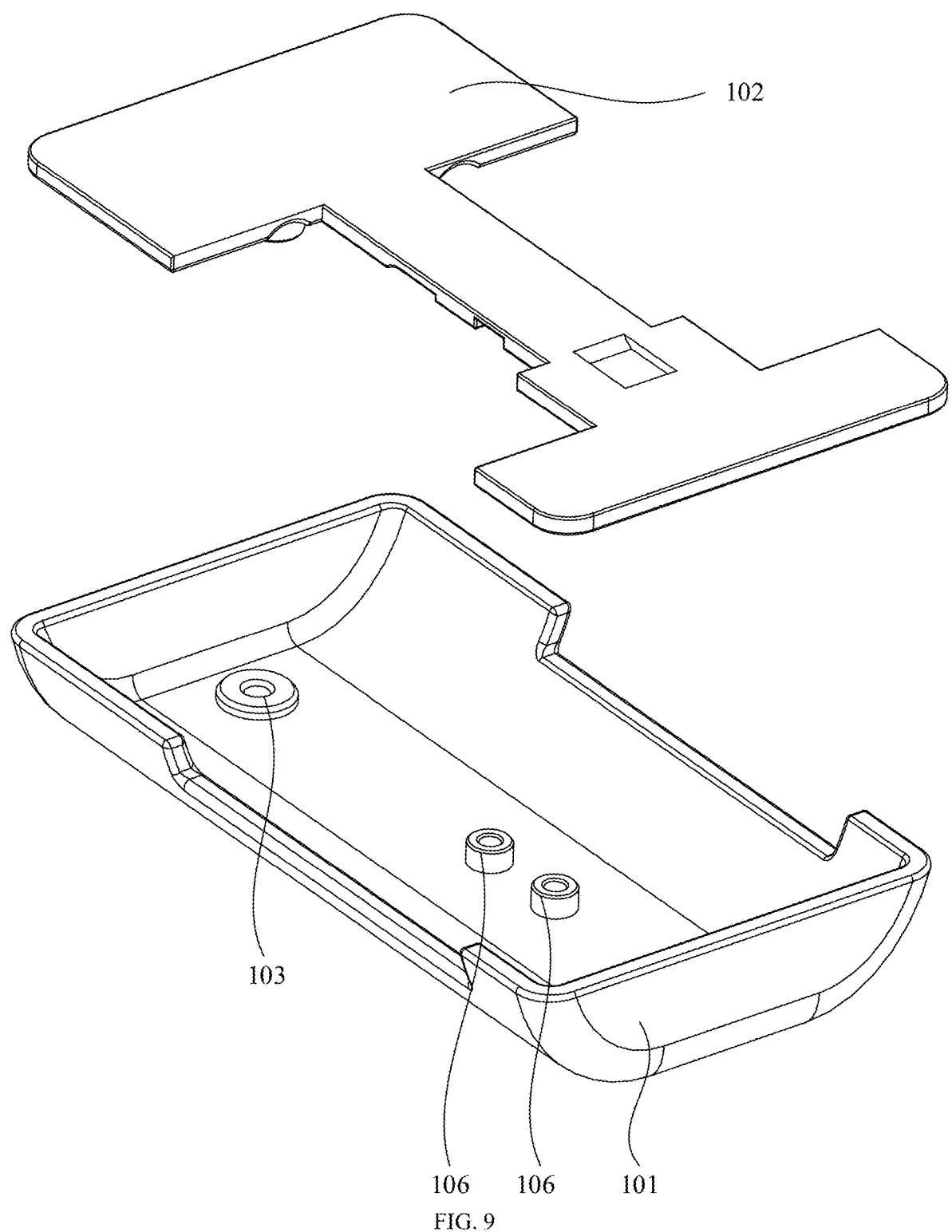
FIG. 9 is a schematic diagram of an exploded structure of a mounting base according to some embodiments of the present disclosure.

FIG. 9 is a schematic diagram of an exploded structure of a mounting base according to embodiments of the present disclosure. Referring to FIG. 9, the mounting bottom base 101 has a first mounting hole 103.

Figure 10:
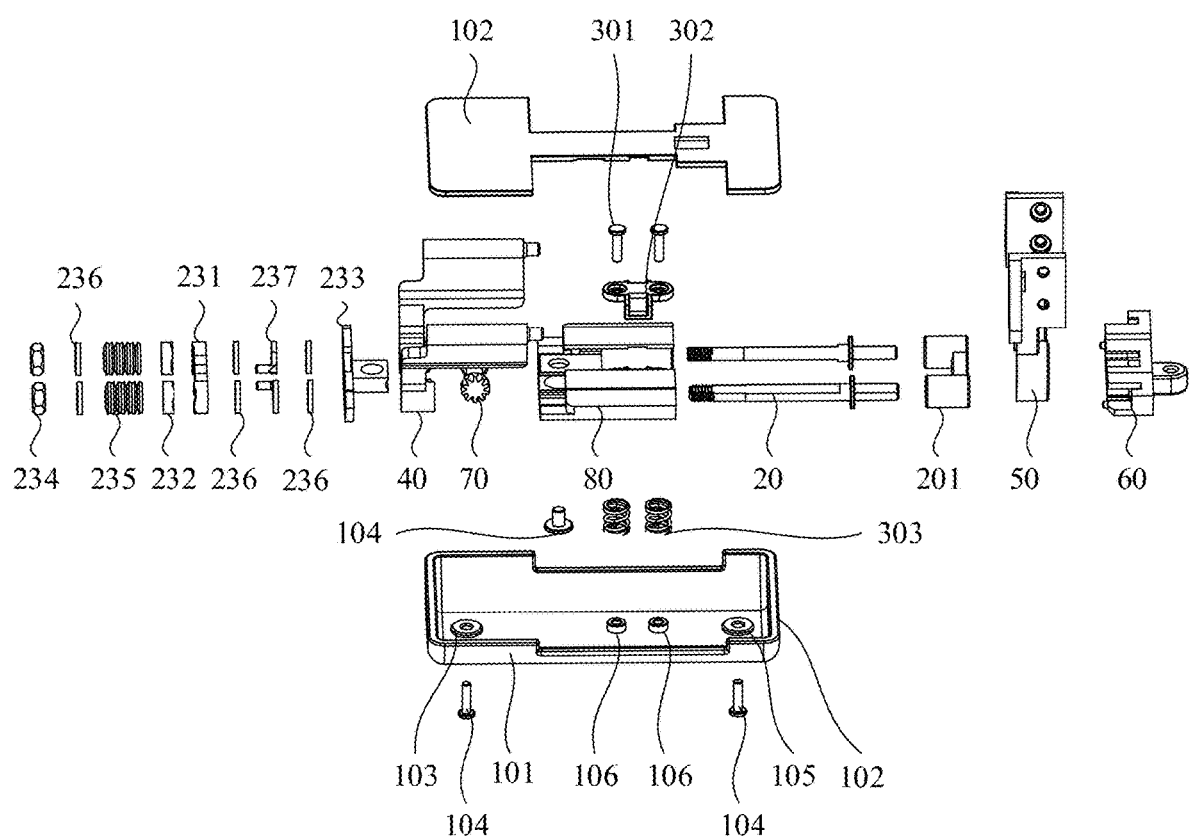
FIG. 10 a schematic diagram of an exploded structure of a hinge according to some embodiments of the present disclosure.

FIG. 10 is a schematic diagram of an exploded structure of a hinge according to embodiments of the present disclosure. Referring to FIG. 10, the mounting base 10 further includes a connecting screw 104, which is threaded to the mounting cover 102 through the first mounting hole 103, i.e., the mounting bottom base 101 and the mounting cover 102 are connected through the first mounting hole 103 and the connecting screw 104.

Figure 11:
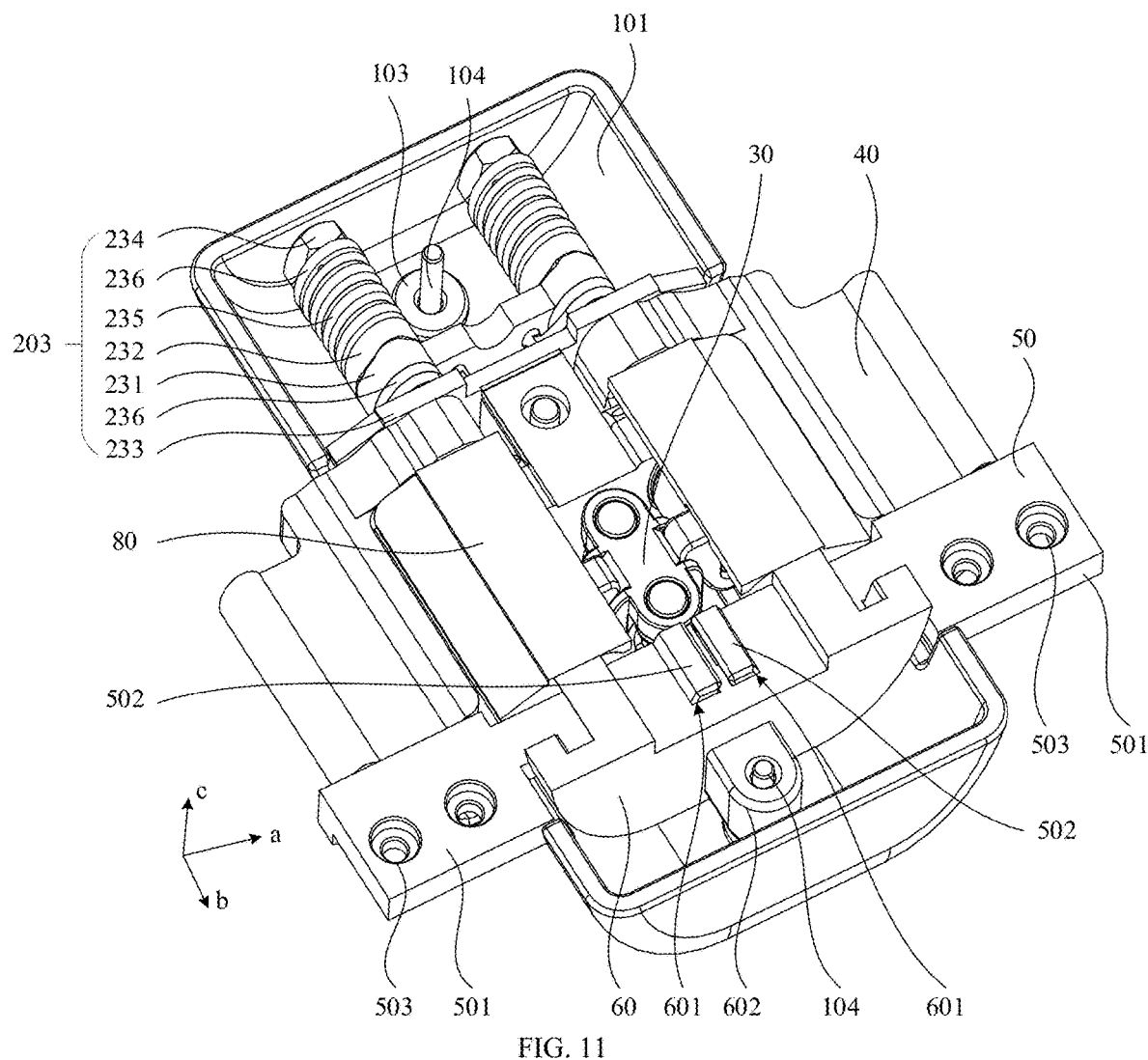
FIG. 11 is a schematic diagram of a structure of a hinge according to some embodiments of the present disclosure.

FIG. 11 is a schematic diagram of the structure of a hinge according to embodiments of the present disclosure. Referring to FIG. 11, the hinge further includes two sliding plates 50 and a fixed block 60. The fixed block 60 is disposed in the mounting base 10 and at an end of the torsion shaft 20, and the fixed block 6) has two curved slides 601. The sliding plate 50 includes a sliding body 501 and an arc arm 502, the sliding body 501 is connected to one end of the arc arm 502, the arc arms 502 of the two sliding plates 50 are disposed in the two curved slide 601 respectively, and the sliding bodies 501 of the two sliding plates 54) are connected to the two rotary arms 40 respectively. When the hinge is applied to a flexible laptop computer, the two sliding bodies 501 are connected to the system end and the display end of the laptop computer respectively.

In the embodiments of the present disclosure, when the rotary arm 40 rotates, the rotary arm 40 drives the sliding body 501 connected to the rotary arm 40 to rotate. When the sliding body 501 rotates, the center of rotation of the sliding body 501 is changed, and the arc arm 502 slides in the curved slide 601, and the arc arm 502 slides relative to the rotary arm 40.

Referring again to FIG. 1, the sliding body 501 has a second mounting hole 503, and the sliding body 501 is connected to the system side and display side of the laptop through the second mounting hole 503.

Exemplarily, one sliding body 501 has two second mounting holes 503.

Referring to FIG. 11, the fixed block 60 has a fixed protrusion 602, the mounting bottom base 101 has a third mounting hole 105 corresponding to the fixed protrusion 602, and the connecting screw 104 is threaded through the third mounting hole 105 and the fixed protrusion 602, i.e., the mounting bottom base 101 is connected to the fixed block 60 through the third mounting hole 105 and the connecting screw 104.

Figure 12:
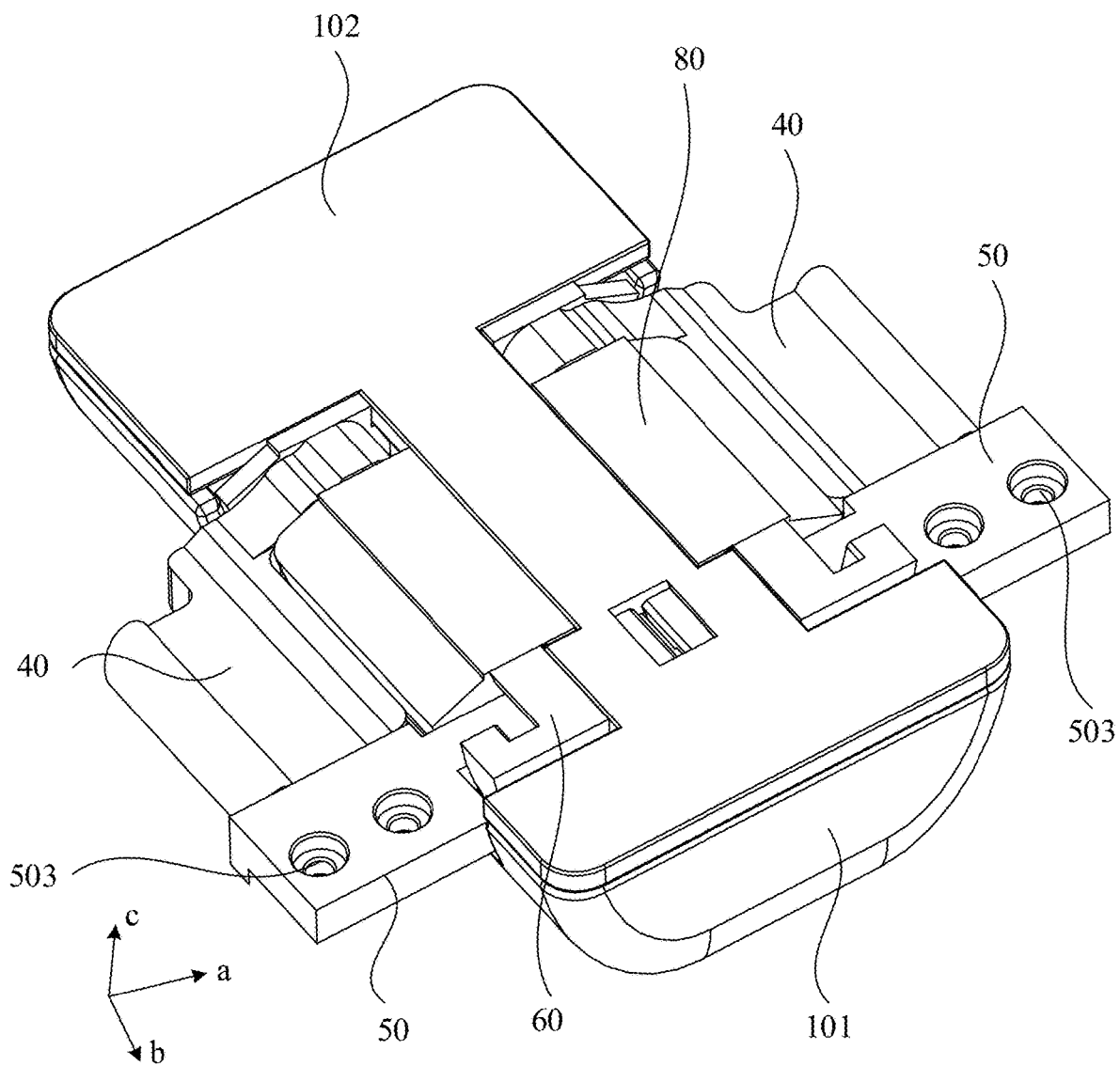
FIG. 12 is a schematic diagram of a structure of a hinge according to some embodiments of the present disclosure.

FIG. 12 is a schematic diagram of the structure of a hinge according to embodiments of the present disclosure. Referring to FIG. 12, the fixed block 60 is disposed in the mounting cavity 100 between the mounting bottom base 101 and the mounting cover 102.

Figure 13:
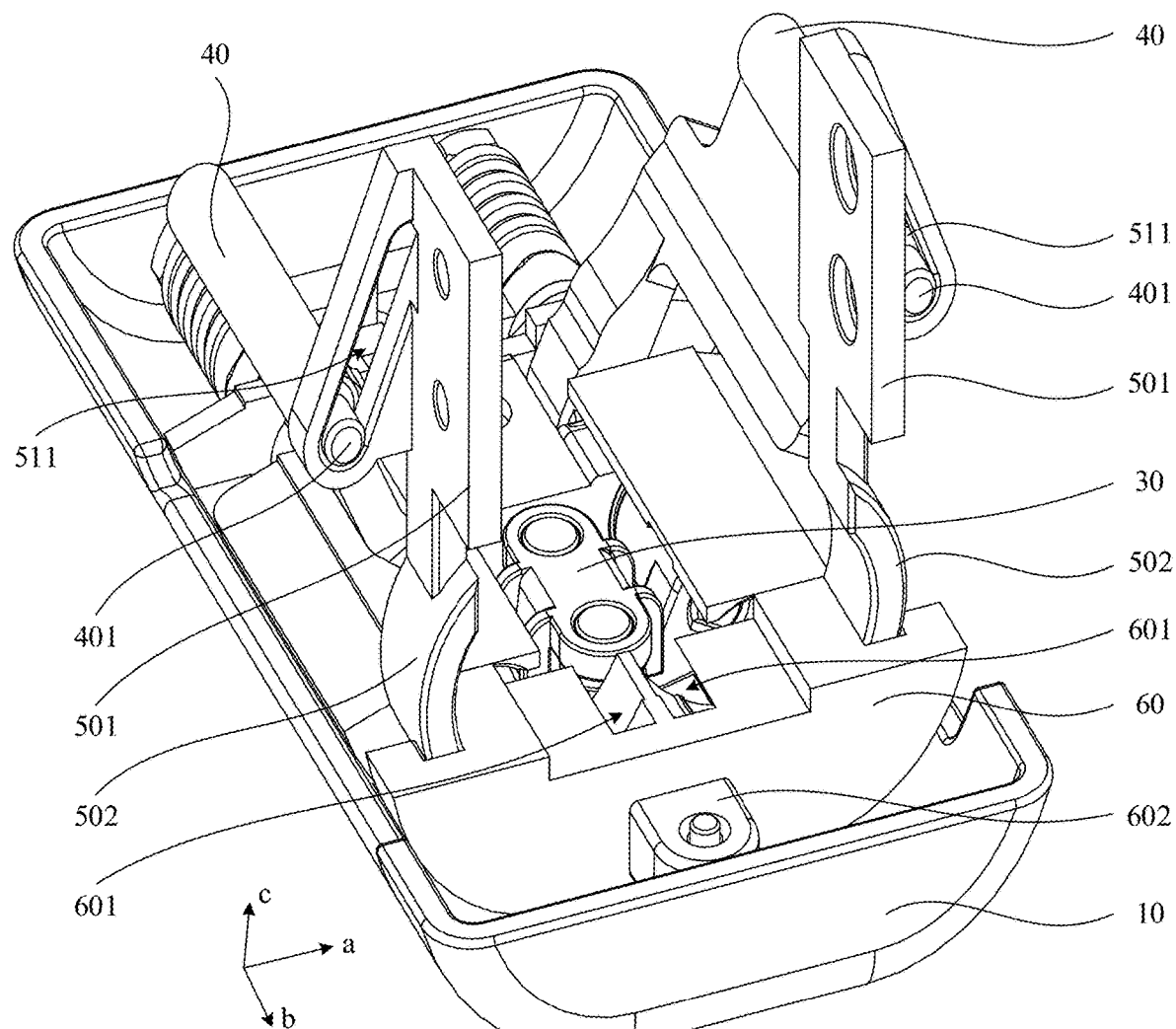
FIG. 13 is a schematic diagram of the structure of the hinge shown in FIG. 11 in a closed state.
Figure 14:
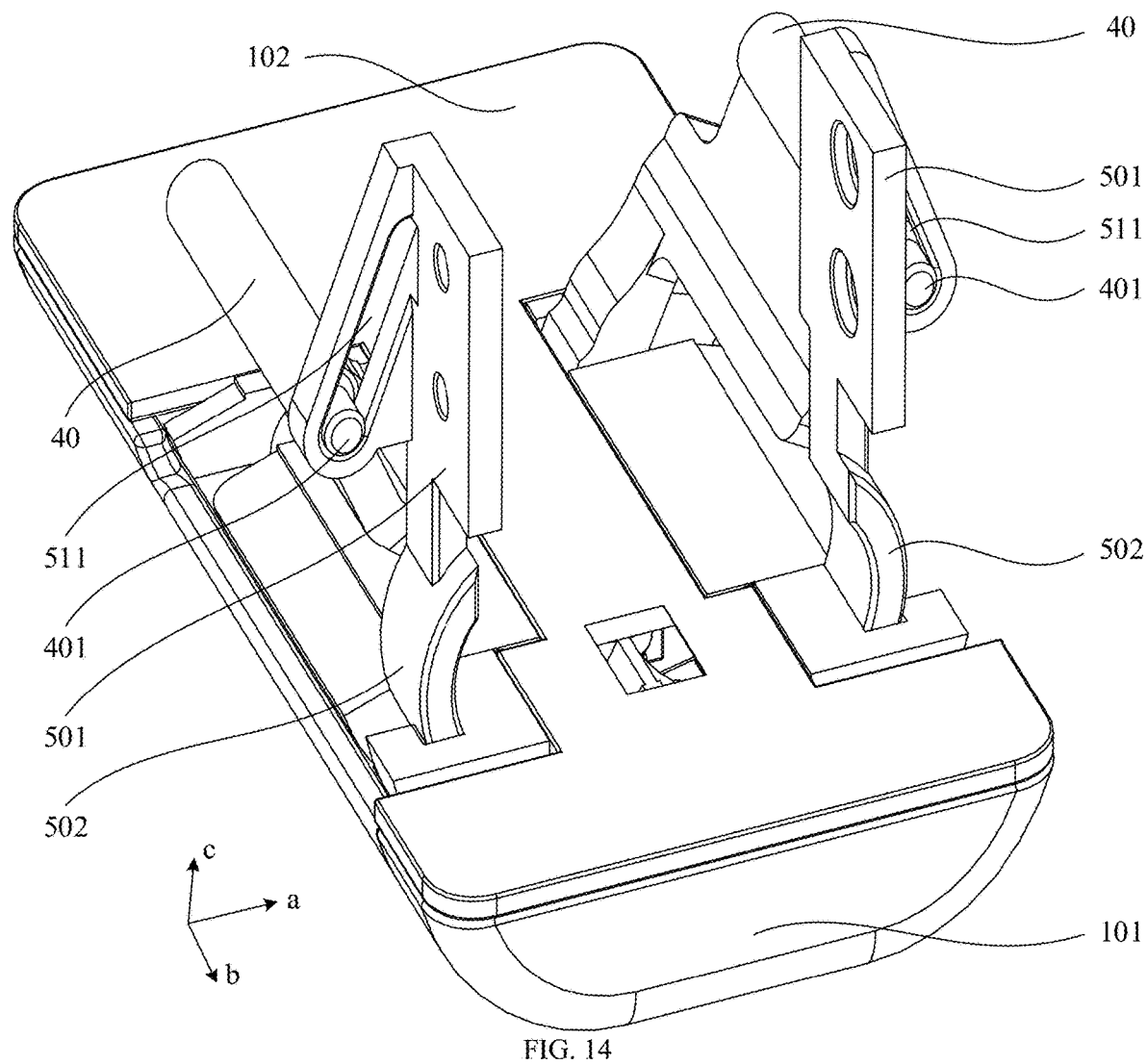
FIG. 14 is a schematic diagram of the structure of the hinge shown in FIG. 12 in a closed state.

The hinges shown in FIG. 11 and FIG. 12 are both in the open state. FIG. 13 is a schematic diagram of the structure of the hinge shown in FIG. 11 in a closed state. FIG. 14 is a schematic diagram of the structure of the hinge shown in FIG. 12 in a closed state. Referring to FIG. 13 and FIG. 14, when the hinge is in the closed state, a portion of the arc arm 502 slides out of the curved slide 601.

Figure 15:
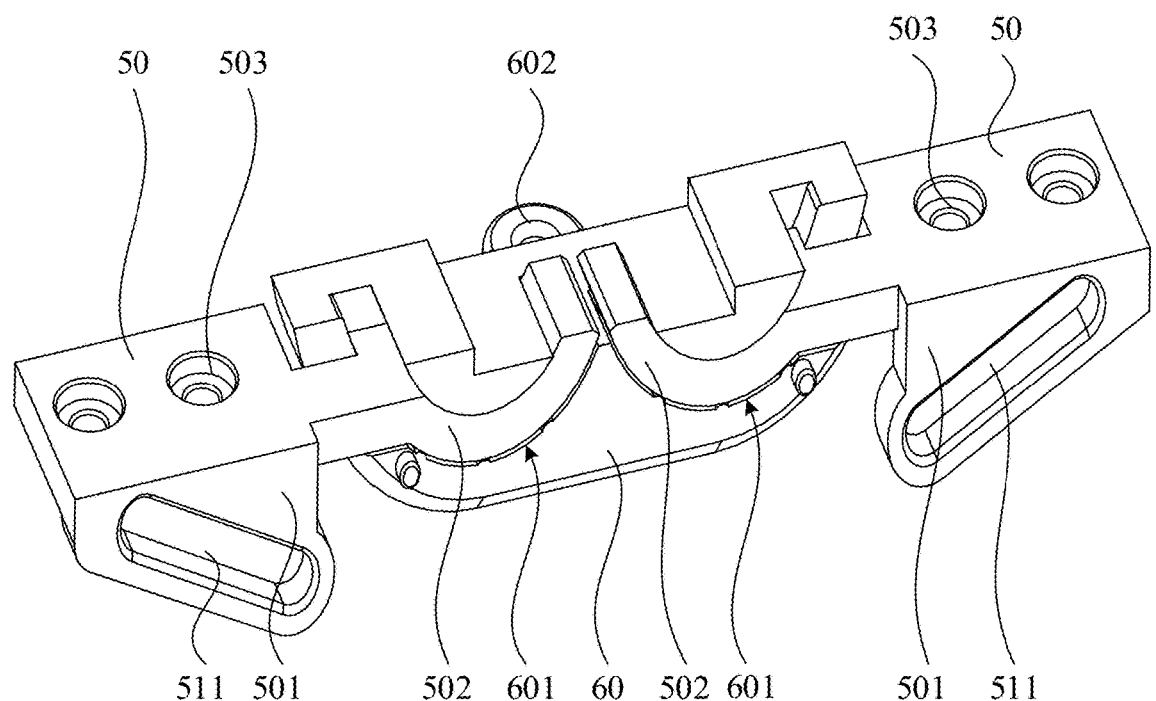
FIG. 15 is a schematic diagram of a matching structure of a sliding plate and a fixed block according to some embodiments of the present disclosure.

FIG. 15 is a schematic diagram of the structure of a sliding plate and a fixed block according to embodiments of the present disclosure. Referring to FIG. 15, the sliding body 501 has a strip slot 511.

Figure 16:
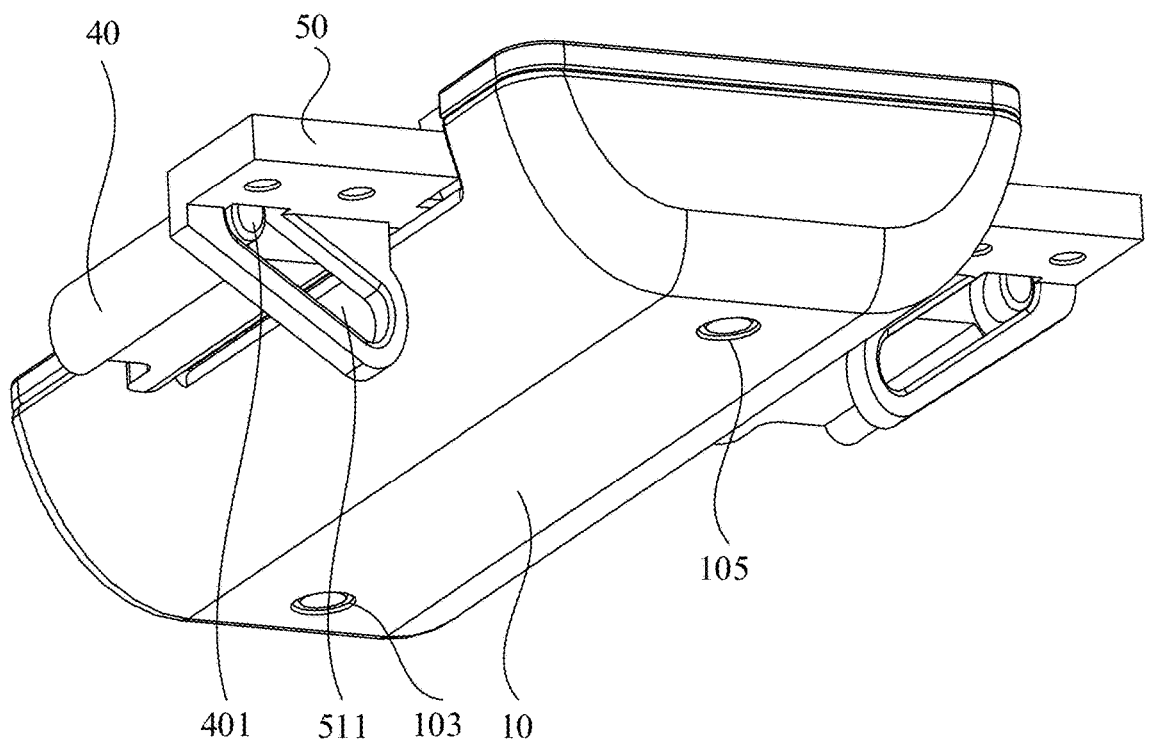
FIG. 16 is a schematic diagram of a structure of a hinge according to some embodiments of the present disclosure.

FIG. 16 is a schematic diagram of a structure of a hinge according to embodiments of the present disclosure. Referring to FIG. 16, a side, close to the sliding plate 50, of the rotary arm 40 near is provided with a connecting slider 401, and the connecting sliders 401 of the two rotary arms 40 are disposed in the strip slots 511 of the two sliding plates 50 respectively.

In the embodiments of the present disclosure, because the center of rotation of the rotary arm 40 is constant during the rotation of the rotary arm 40 and the center of rotation of the sliding body 501 is changed during the rotation, the relative position between the sliding body 501 and the rotary arm 40 is changed. The strip slot 511 is arranged on the sliding body 501, and the connecting slider 401 slides in the strip slot 511 when the rotary arm 40 and the sliding body 501 are rotating, such that the rotary arm 40 and the sliding body 501 are connected and slide relative to each other.

Figure 17:
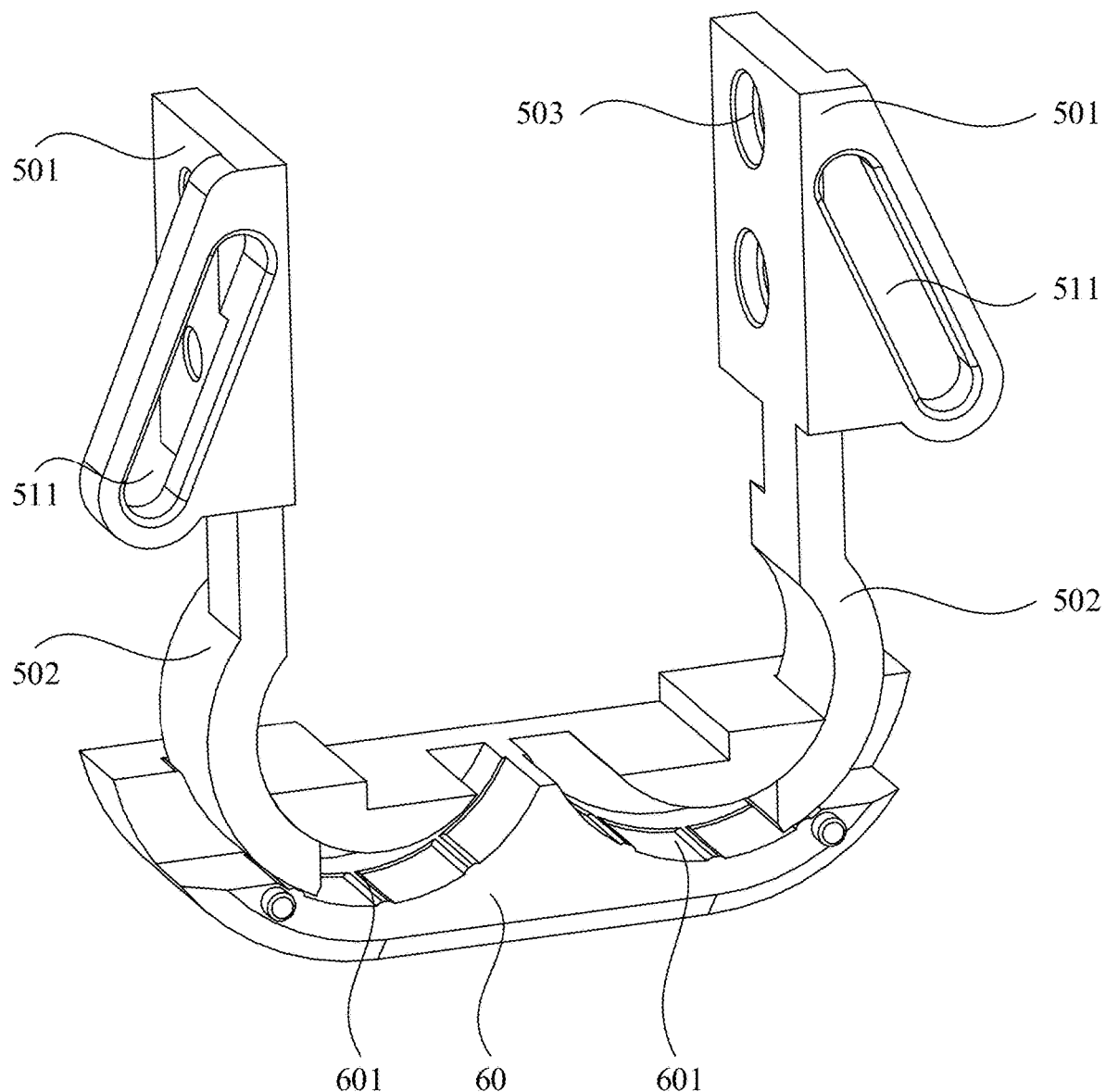
FIG. 17 is a schematic diagram of a matching structure of a sliding plate and a fixed block according to some embodiments of the present disclosure.

In FIG. 15, the two sliding bodies 501 are in an open state, and FIG. 17 is a schematic diagram of a structure of a sliding plate and a fixed block according to embodiments of the present disclosure. Referring to FIG. 17, the two sliding bodies 501 are in a closed state.

Referring again to FIG. 10, the hinge further includes a synchronization shaft 70 and a fixed base 80, the synchronization shaft 71) and the fixed base 80 are disposed in the mounting base 10, a middle of the synchronization shaft 70 is rotatably connected to the fixed base 80, and the fixed base 80 is connected to the mounting base 10. The synchronization shaft 70 is disposed between the two torsion shafts 20 and perpendicular to the two torsion shafts 20.

In the embodiments of the present disclosure, the synchronization shaft 70 causes the rotation of the two torsion shafts 20 to be synchronized.

Figure 18:
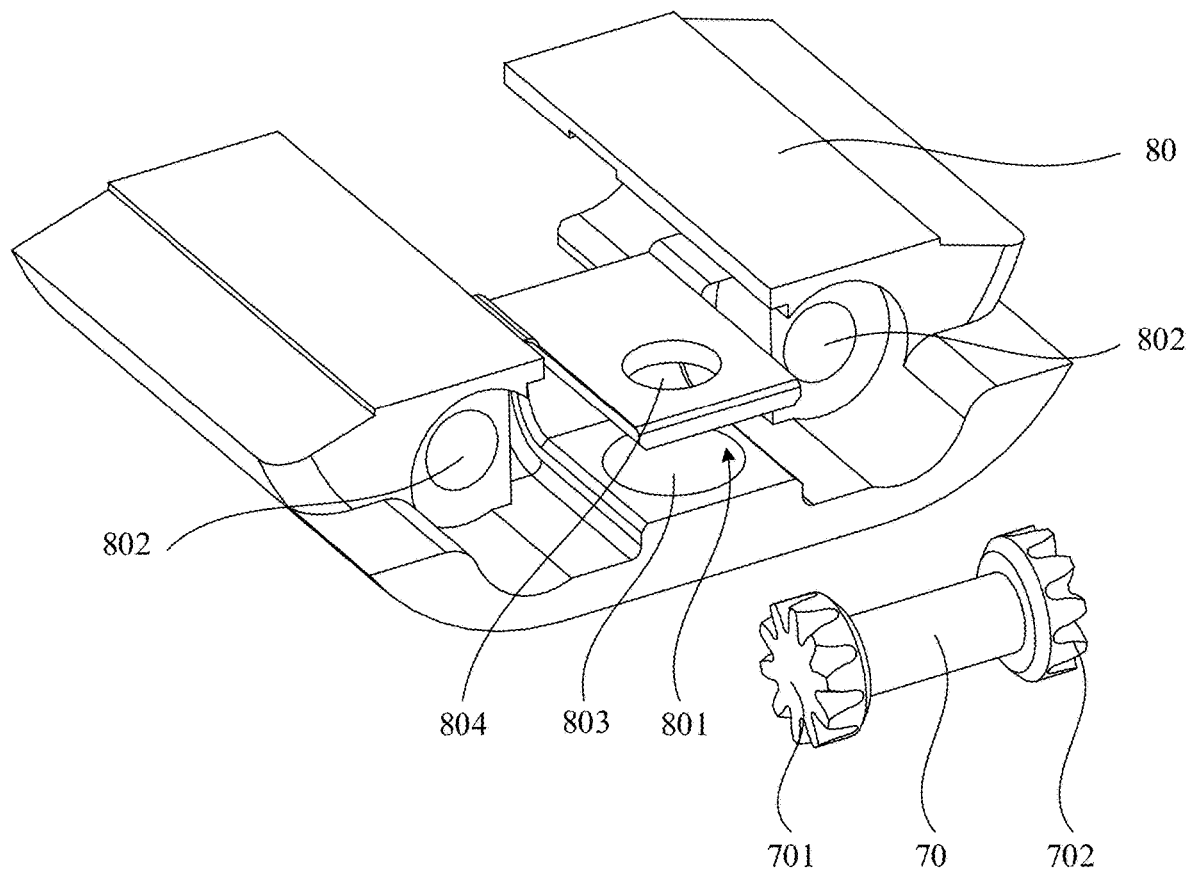
FIG. 18 is a schematic diagram of an exploded structure of a synchronization shaft and a fixed base according to some embodiments of the present disclosure.

FIG. 18 is a schematic diagram of an exploded structure of a synchronization shaft and a fixed base according to embodiments of the present disclosure. Referring to FIG. 18, the synchronization shaft 70 has a first synchronization gear 701 at a first end of the synchronization shaft 70 and a second synchronization gear 702 at a second end of the synchronization shaft 70, the first synchronization gear 701 is connected to one of the two torsion shafts 20 by transmission, and the second synchronization gear 702 is connected to the other of the two torsion shafts 20 by transmission.

In the embodiments of the present disclosure, in the case that one of the two torsion shafts 20 rotates, the torsion shaft 20 drives the first synchronization gear 701 to rotate, the first synchronization gear 701 drives the second synchronization gear 702 to rotate, and the second synchronization gear 702 drives the other torsion shaft 20 of the two torsion shafts 20 to rotate, thereby ensuring that the two torsion shafts 20 rotate synchronously.

Exemplarily, the two torsion shafts 20 are provided with a third synchronization gear 204, and the third synchronization gears 204 on the two torsion shafts 20 engage with the first synchronization gear 701 and the second synchronization gear 702 respectively.

In the embodiments of the present disclosure, the middle of the torsion shaft 20 is a square column, the bumps 201, the third synchronization gear 204 and the holes on the rotary arm 40 passed by the torsion shaft 20 are square holes. The square columns are disposed in the square holes, such that the bumps 201, the third synchronization gear 204 and the torsion shaft 20 can rotate together when the rotary arm 40 rotates.

Figure 19:
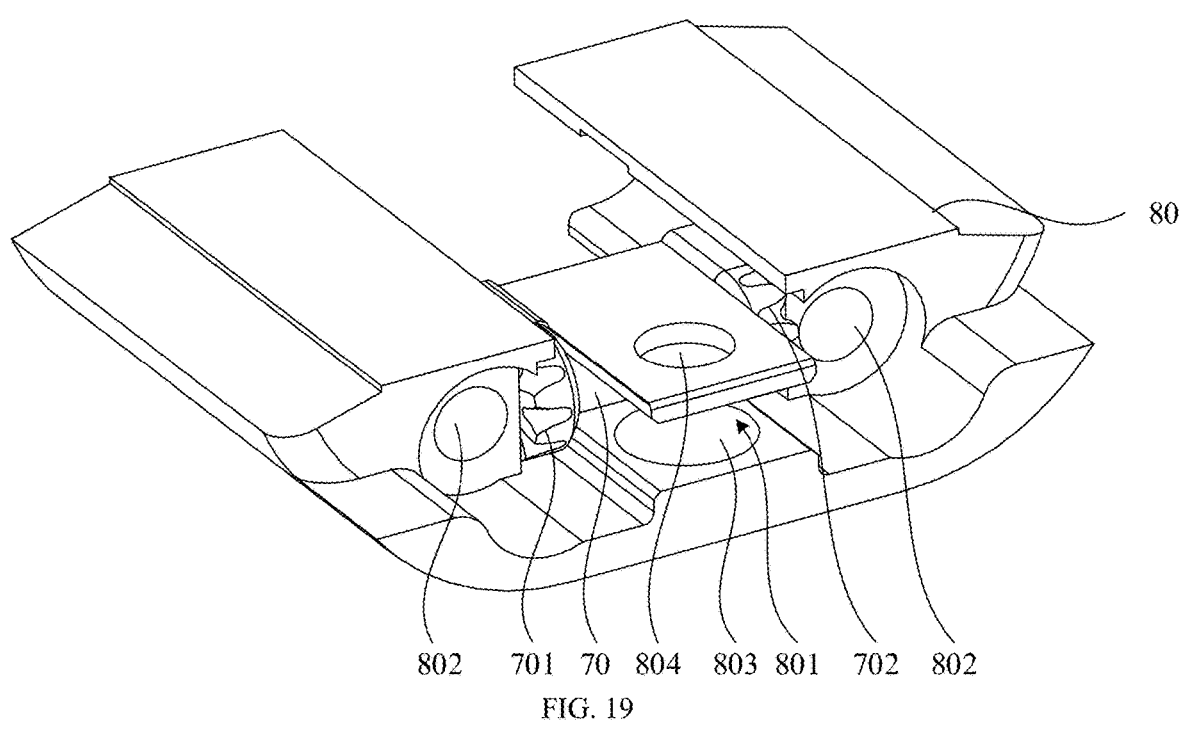
FIG. 19 is a schematic diagram of a matching structure of a synchronization shaft and a fixed base according to some embodiments of the present disclosure.

FIG. 19 is a schematic diagram of a mating structure of a synchronization shaft and a fixed base according to embodiments of the present disclosure. Referring to FIG. 19, the central part of the fixed base 80 has a mounting through slot 801, the synchronization shaft 70 is disposed in the mounting through slot 801, and the first synchronization gear 701 and the second synchronization gear 702 are disposed on opposite sides of the fixed base 80.

In the embodiments of the present disclosure, the synchronization shaft 70 rotates when the two torsion shafts 20 rotate. The mounting through slot 801 is arranged in the middle of the fixed base 80, and the first synchronization gear 701 and the second synchronization gear 702 are disposed on opposite sides of the fixed base 80, such that the stability of the synchronization shaft 70 and the rotation of the synchronization shaft 70 are ensured.

Referring again to FIG. 18 and FIG. 19, the fixed base 80 has two torsion shaft through holes 802, and the two torsion shafts 20 pass through the two torsion shaft through holes 802. The two torsion shafts 20 pass through the two torsion shaft through-holes 802 respectively.

Referring again to FIG. 18 and FIG. 19, the fixed base 80 has a fourth mounting hole 803 and a fifth mounting hole 804. The fourth mounting hole 803 and the fifth mounting hole 804 are disposed on both sides of the mounting through slot 801 respectively, and are communicated with the mounting through slot 801. The connecting screw is connected to the mounting cover 102 after passing through the fourth mounting hole 803 and the fifth mounting hole 804 in turn, thereby fixing the fixed base 80 in the mounting cavity 100 between the mounting bottom base 101 and the mounting cover 102.

Referring again to FIGS. 2 and 4, the resilient structure 30 includes a guide member 301, a slider 302, and a first resilient member 303. The guide member 301 is fixedly connected to the mounting base 10, the slider 302 is connected to the guide member 301 and is slidable along the guide member 301, the bump 201 is in contact with the slider 302, and the first resilient member 303 is configured to supply a spring force to the slider 302, with the spring force in the direction towards the bump 201.

In the embodiments of the present disclosure, when the hinge is closed, the bump 201 exerts a resisting force on the slider 302, and the slider 302 presses the first resilient member 303, causing the first resilient member 303 to exert a resilient force in the third direction c toward the slider 302.

Exemplarily, the guide member 301 extends along the third direction c, and the sliding direction of the guide member 301 is parallel to the third direction c.

Figure 20:
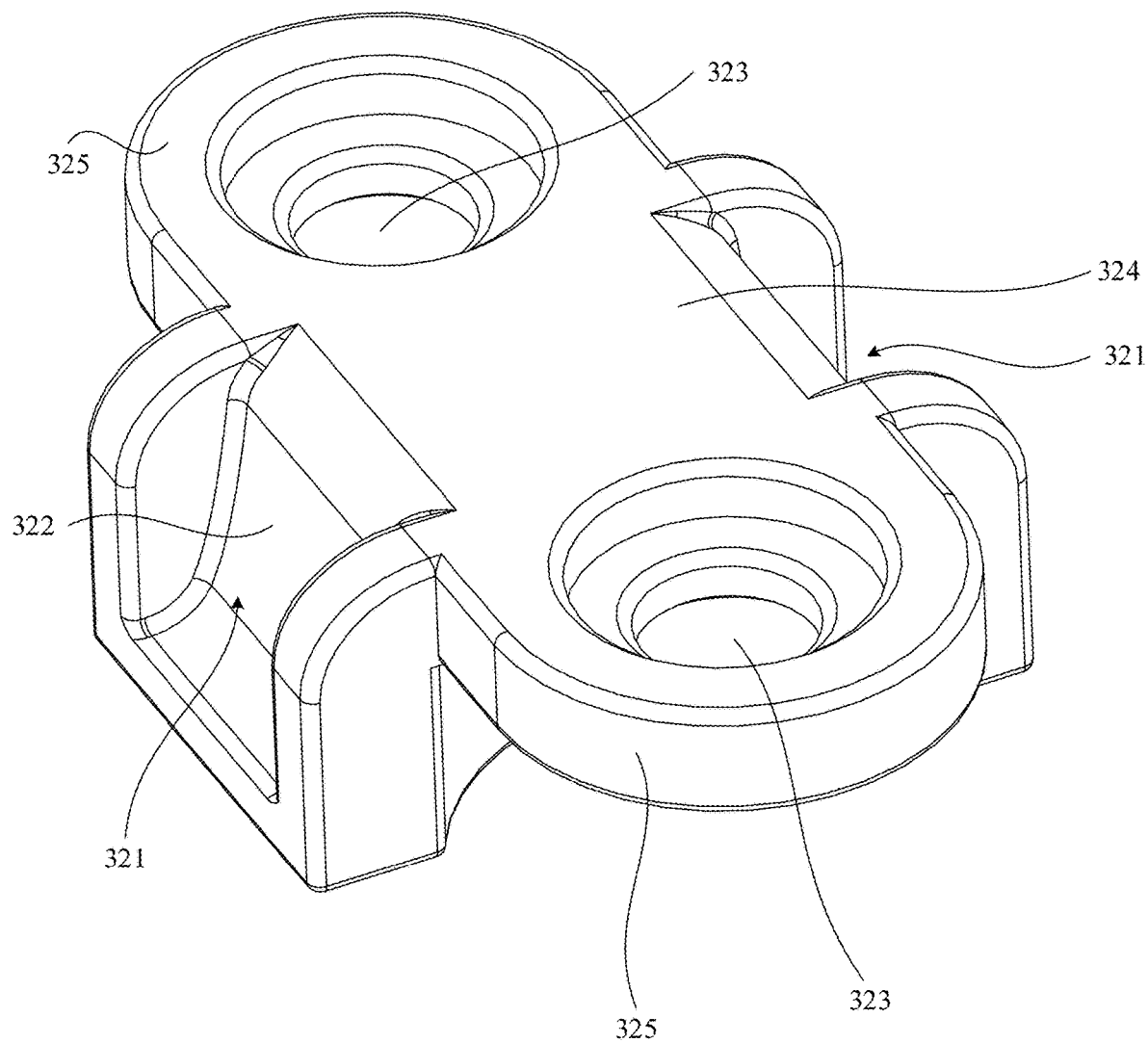
FIG. 20 is a schematic diagram of the structure of a slider according to some embodiments of the present disclosure.

FIG. 20 is a schematic diagram of the structure of a slider according to embodiments of the present disclosure. Referring to FIG. 20, two push slots 321 are disposed on a surface of the slider 302. The two push slots 321 are disposed on the surface, close to the bump 201, of the slider 302 at opposite sides of the slider 302. The two push slots 321 are arranged along the two torsion shafts 20, and the two bumps 201 of the two torsion shafts 20 are disposed in the two push slots 321 respectively.

In the embodiments of the present disclosure, the push slots 321 are arranged on the slider 302 to place the bumps 201.

In some embodiments of the present disclosure, bottom surfaces of the two push slots 321 are inclined surfaces 322, and the bumps 201 are in contact with the inclined surfaces 322. A distance between the bottom surfaces of the two push slots 321 close to the end of the bump 201 is greater than a distance between the bottom surfaces of the two push slots 321 away from the end of the bump 201.

In other embodiments, the bottom surfaces of the two push slots 321 are flat.

Referring again to FIG. 20, the slider 302 includes a body portion 324 and two protrusions 325. The two push slots 321 are disposed on opposite sides of the body portion 324 and the two protrusions 325 are disposed at opposite sides of the body portion 324 and between the two push slots 321 and connected to the body portion 324. Each of the two protrusions 325 is provided with a guide hole 323.

Referring again to FIG. 4, the guide member 301 includes two guide rods 311, at least one end of the two guide rods 311 is fixedly connected to the mounting base 10, and the two guide rods 311 are disposed in the guide holes 323 of the two protrusions 325 respectively.

In the embodiments of the present disclosure, the main portion 324 is configured to arrange the push slot 321, and the two protrusions 325 are configured to install the two guide bars 311, while the two guide bars 311 are also configured to install the slider 302 to ensure the stability of the slider 302.

In FIG. 20, the slider 302 includes two guide holes 323. In other embodiments, the slider 302 includes one guide hole 323.

Figure 21:
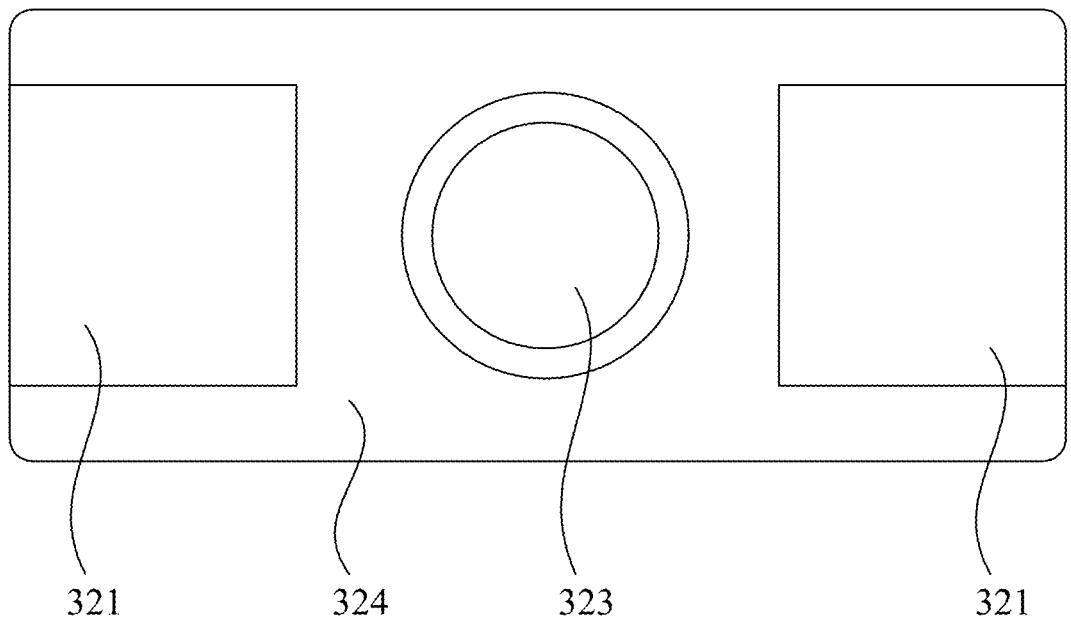
FIG. 21 is a schematic diagram of the structure of a slider according to some embodiments of the present disclosure.

FIG. 21 is a schematic diagram of the structure of a slider according to embodiments of the present disclosure. Referring to FIG. 21, a guide hole 323 is disposed in the middle of the slider 302, and the guide hole 323 is disposed between the two push slots 321. The guide member 301 includes a guide rod 311, and at least one end of the guide bar 311 is connected to the mounting base 10 and is disposed in the guide hole 323.

Figure 22:
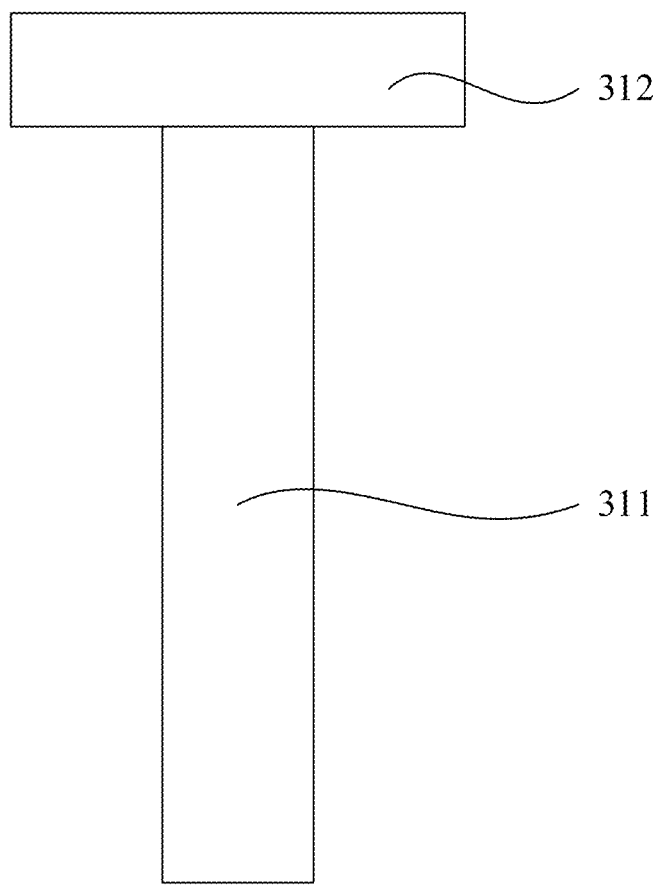
FIG. 22 is a schematic diagram of a structure of a guide bar according to some embodiments of the present disclosure.

FIG. 22 is a schematic diagram of the structure of a guide bar according to embodiments of the present disclosure. Referring to FIG. 22, t a first retaining protrusion 312 is disposed on a side wall of the guide rod 311, and the first retaining protrusion 312 is disposed on a side, close to the bump 201, of the slider 302.

In the embodiments of the present disclosure, the first retaining protrusion 312 is configured to retain the sliding of the slider 302 and avoid the slider 302 from sliding out of the guide bar 311.

Referring again to FIGS. 9 and 10, the mounting base 101 is provided with a threaded groove 106 and the guide bar 311 is threaded to the threaded groove 106.

In some embodiments of the present disclosure, the first resilient member 303 is disposed between the mounting base 10 and the slider 302, and is disposed on a side, away from the first retaining protrusion 312, of the slider 302, and the first resilient member 303 is in a compressed state. The resilient force is supplied by the first resilient member 303 in the compressed state.

In other embodiments of the present disclosure, the first resilient member 303 is disposed on a side, close to the first retaining protrusion 312, of the slider 302 near, and the first resilient member 303 is in a stretched state. The resilient force is supplied by the first resilient member 303 in the stretched state.

In the embodiments of the present disclosure, the first resilient member 303 is a spring.

Figure 23:
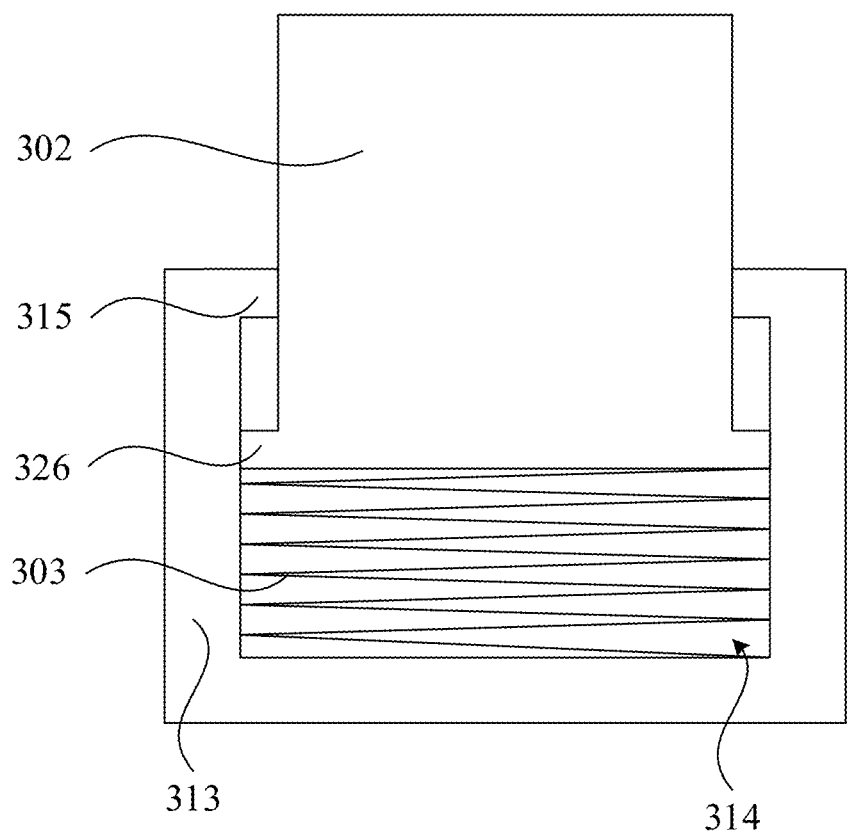
FIG. 23 is a schematic diagram of a structure of a resilient structure according to some embodiments of the present disclosure.

The above resilient structure is a structure. In other embodiments, the resilient structure is also other structures. FIG. 23 is a structural schematic diagram of a resilient structure according to embodiments of the present disclosure. Referring to FIG. 23, the guide member 301 includes a base 313, the base 313 is provided with a holding slot 314, and the holding slot 314 is disposed on a side, close to the bump 201, of the base 313. The slider 302 is disposed partly in the holding slot 314 and partly outside the holding slot 314 and is telescopable relative to the base 313, and the first resilient member 303 is disposed in the holding slot 314.

In the embodiments of the present disclosure, the slider 302 slides in the holding slot 314 to press against the first resilient member 303, causing the first resilient member 303 to produce elasticity.

Referring again to FIG. 23, a second retaining protrusion 315 is disposed on a side wall of the holding slot 314, a third retaining protrusion 326 is disposed on a side wall of the slider 302, the third retaining protrusion 326 is disposed in the holding slot 314 and on a side, distal from the bump 201, of the second retaining protrusion 315. On a plane perpendicular to the telescoping direction of the slider 302, an orthographic projection of the second retaining protrusion 315 is at least partially overlapped with an orthographic projection of the third retaining protrusion 326.

In the embodiments of the present disclosure, the second retaining protrusion 315 and the third retaining protrusion 326 are configured to retain the sliding of the slider 302 and avoid the slider 302 from sliding out of the holding slot 314.

Embodiments of the present disclosure also provide an electronic device, the electronic device including the lunge described above.

In specific embodiments, the electronic device according to embodiments of the present disclosure may be a cell phone, a tablet computer, a television, a monitor, a laptop computer, a digital photo frame, a navigator, or any other product or component having a display function.

Exemplarily, the electronic device is a laptop computer.

The above descriptions are merely optional embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A hinge for synchronous rotation, comprising: a mounting base, two torsion shafts, a resilient structure, two rotary arms, and a synchronization shaft; wherein
   the two torsion shafts and the resilient structure are mounted on the mounting base, the resilient structure is disposed between the two torsion shafts, and the two rotary arms are connected to the two torsion shafts respectively;
   a bump is disposed on a side wall of each of the two torsion shafts, wherein the bump is disposed on a side, close to the resilient structure, of the torsion shaft, and the bumps of the two torsion shafts are in contact with the resilient structure;
   the synchronization shaft is disposed between the two rotary arms and perpendicular to the two torsion shafts, the synchronization shaft has a first synchronization gear at a first end of the synchronization shaft and a second synchronization gear at a second end of the synchronization shaft, the two torsion shafts are provided with third synchronization gears respectively, and the third synchronization gears engage with the first synchronization gear and the second synchronization gear respectively; and
   the resilient structure is configured to apply a force to the torsion shaft by the bumps, such that the two rotary arms have a tendency to rotate away from each other.

2. The hinge according to claim 1, wherein the resilient structure comprises a guide member, a slider, and a first resilient member; wherein
   the guide member is fixedly connected to the mounting base;
   the slider is connected to the guide member and is slidable along the guide member, and the bump is in contact with the slider; and
   the first resilient member is configured to supply a spring force to the slider, wherein the spring force is in a direction towards the bump.

3. The hinge according to claim 2, wherein two push slots are disposed on a surface of the slider, wherein the two push slots are disposed on the surface, close to the bump, of the slider and at opposite sides of the slider, the two push slots are arranged along the two torsion shafts, and the bumps of the two torsion shafts are disposed in the two push slots respectively.

4. The hinge according to claim 3, wherein bottom surfaces of the two push slots are inclined surfaces, and the bump is in contact with the inclined surface.

5. The hinge according to claim 3, wherein a guide hole is disposed in a middle of the slider, and the guide hole is disposed between the two push slots; and the guide member comprises a guide rod, wherein at least at one end of the guide rod is connected to the mounting base and is disposed in the guide hole.

6. The hinge according to claim 3, wherein the slider comprises a body portion and two protrusions; wherein
the two push slots are disposed on opposite sides of the body portion;
the two protrusions are disposed on opposite sides of the body portion and between the two push slots and connected to the body portion;
each of the two protrusions is provided with a guide hole; and
the guide member comprises two guide rods, wherein at least one end of the two guide rods is fixedly connected to the mounting base, and the two guide rods are disposed in the guide holes of the two protrusions respectively.

7. The hinge according to claim 5, wherein a first retaining protrusion is disposed on a side wall of the guide rod, wherein the first retaining protrusion is disposed on a side, close to the bump, of the slider.

8. The hinge according to claim 7, wherein the first resilient member is disposed between the mounting base and the slider and on a side, away from the first retaining protrusion, of the slider, and the first resilient member is in a compressed state; or
the first resilient member is disposed on a side, close to the first retaining protrusion, of the slider, and the first resilient member is in a stretched state.

9. The hinge according to claim 2, wherein the guide member comprises a base, the base being provided with a holding slot, the holding slot being disposed on a side, close to the bump, of the base;
the slider is disposed partly in the holding slot and partly outside the holding slot and is telescopable relative to the base; and
the first resilient member is disposed in the holding slot.

10. The hinge according to claim 9, wherein a second retaining protrusion is disposed on a side wall of the holding slot, a third retaining protrusion is disposed on a side wall of the slider, and the third retaining protrusion is disposed in the holding slot and on a side, distal from the bump, of the second retaining protrusion; and
on a plane perpendicular to a telescoping direction of the slider, an orthographic projection of the second retaining protrusion is at least partially overlapped with an orthographic projection of the third retaining protrusion.

11. The hinge according to claim 2, wherein the first resilient member is a spring.

12. The hinge according to claim 1, wherein the hinge further comprises two sliding plates and a fixed block, the fixed block being disposed in the mounting base and at an end of the torsion shaft, the fixed block having two curved slides;
wherein the sliding plate comprises a sliding body and an arc arm, the sliding body is connected to one end of the arc arm, the arc arms of the two sliding plates are disposed in the two curved slides respectively, and the sliding bodies of the two sliding plates are connected to the two rotary arms respectively.

13. The hinge according to claim 12, wherein the sliding body has a strip slot; and
a connecting slider is disposed on a side, close to the sliding plate, of the rotary arm, and the connecting sliders of the two rotary arms are disposed in the strip slots of the two sliding plates respectively.

14. The hinge according to claim 1, wherein the hinge further comprises a fixed base, the synchronization shaft and the fixed base being disposed in the mounting base, a middle of the synchronization shaft being rotatably connected to the fixed base, the fixed base being connected to the mounting base.

15. The hinge according to claim 14, wherein a mounting through slot is disposed in a middle of the fixed base, the synchronization shaft is disposed in the mounting through slot, and the first synchronization gear and the second synchronization gear are disposed on opposite sides of the fixed base.

16. The hinge according to claim 1, wherein the torsion shaft comprises a spindle and a damping structure, the damping structure comprising a first end cam, a second end cam, a first axial retaining member, a second axial retaining member, and a second resilient member;
wherein the first retaining member, the first end cam, the second end cam, the second resilient member, and the second retaining member are sequentially sleeved on the spindle, and an end face of the first end cam is engaged with an end face of the second end cam; and
side walls of the first end cams of two the torsion shafts are connected to each other.

17. The hinge according to claim 16, wherein the damping structure further comprises a friction plate, the friction plate being sleeved on the spindle, the friction plate being disposed at least:
between the first retaining member and the first end cam;
between the second end cam and the second resilient member; or
between the second resilient member and the second retaining member.

18. An electronic device, comprising a hinge,
wherein the hinge comprises: a mounting base, two torsion shafts, a resilient structure, two rotary arms, and a synchronization shaft; wherein
the two torsion shafts and the resilient structure are mounted on the mounting base, the resilient structure is disposed between the two torsion shafts, and the two rotary arms are connected to the two torsion shafts respectively;
a bump is disposed on a side wall of each of the two torsion shafts, wherein the bump is disposed on a side, close to the resilient structure, of the torsion shaft, and the bumps of the two torsion shafts are in contact with the resilient structure;
the synchronization shaft is disposed between the two rotary arms and perpendicular to the two torsion shafts, the synchronization shaft has a first synchronization gear at a first end of the synchronization shaft and a second synchronization gear at a second end of the synchronization shaft, the two torsion shafts are provided with third synchronization gears respectively, and the third synchronization gears engage with the first synchronization gear and the second synchronization gear respectively; and
the resilient structure is configured to apply a force to the torsion shaft by the bumps, such that the two rotary arms have a tendency to rotate away from each other.

19. The electronic device according to claim 18, wherein the electronic device is a laptop computer.

20. The hinge according to claim 6, wherein a first retaining protrusion is disposed on a side wall of the guide rod, wherein the first retaining protrusion is disposed on a side, close to the bump, of the slider.

* * * * *